Feb. 16, 1960          J. T. WALLACE          2,924,921
AUTOMATIC SPOOLING MACHINE FOR 8 MM. FILM
Filed July 18, 1957          26 Sheets-Sheet 1
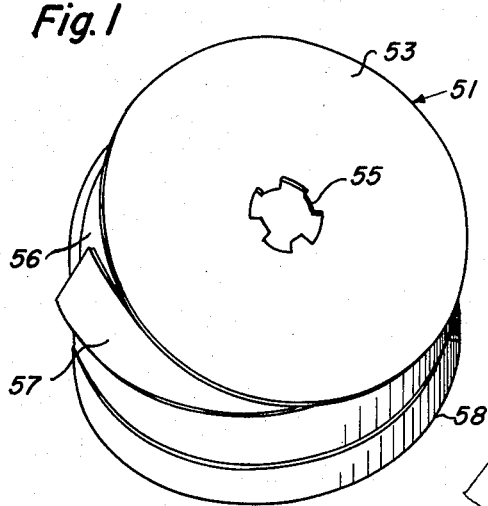
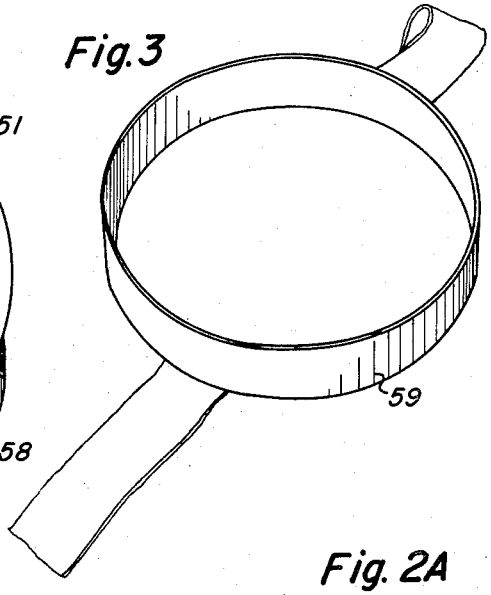
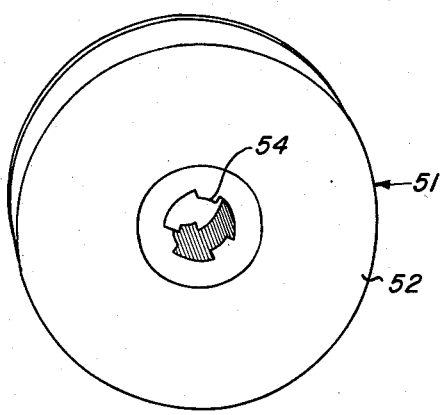
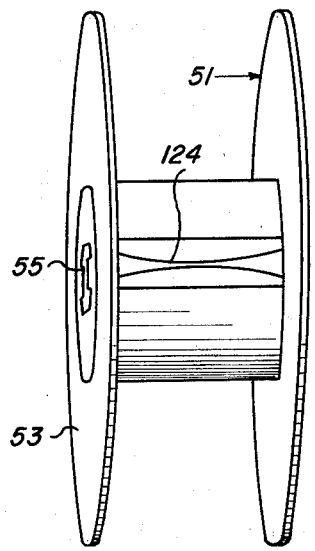
JOHN T. WALLACE
INVENTOR.
BY
ATTORNEYS Feb. 16, 1960 J. T. WALLACE 2,924,921
AUTOMATIC SPOOLING MACHINE FOR 8 MM. FILM
Filed July 18, 1957 26 Sheets-Sheet 2

JOHN T. WALLACE
INVENTOR.

BY Daniel I. Mayne
J. Griffin Little
ATTORNEYS

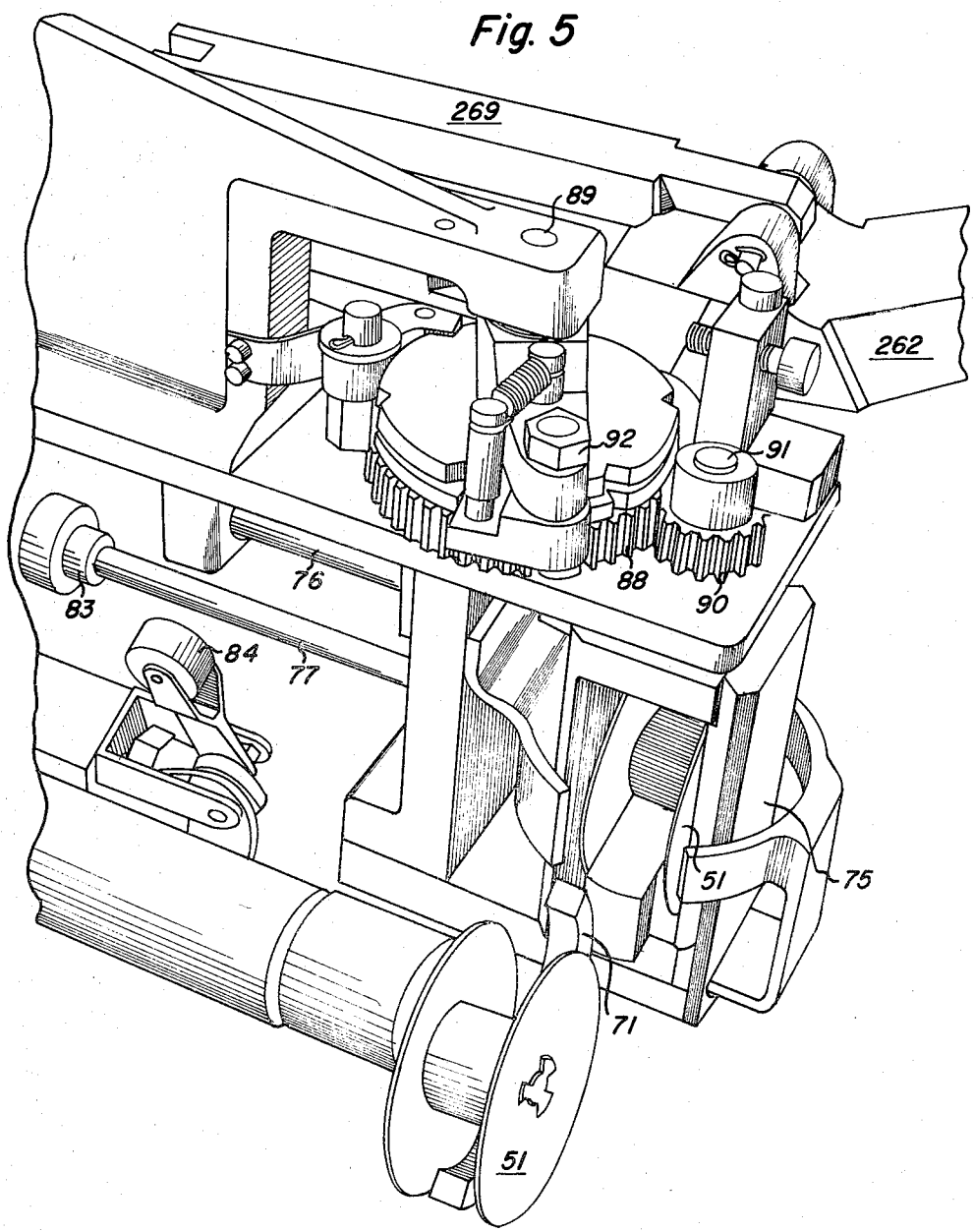

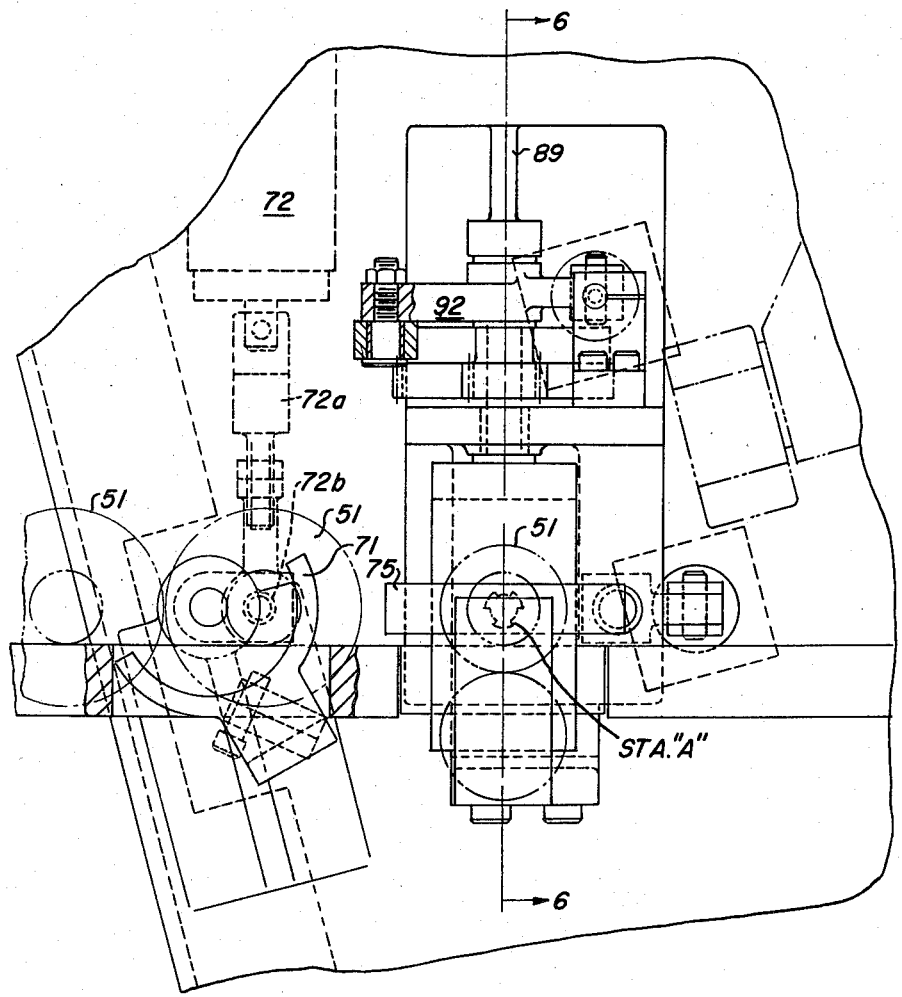

Feb. 16, 1960  J. T. WALLACE  2,924,921
AUTOMATIC SPOOLING MACHINE FOR 8 MM. FILM
Filed July 18, 1957  26 Sheets-Sheet 5

JOHN T. WALLACE
INVENTOR.

BY

ATTORNEYS

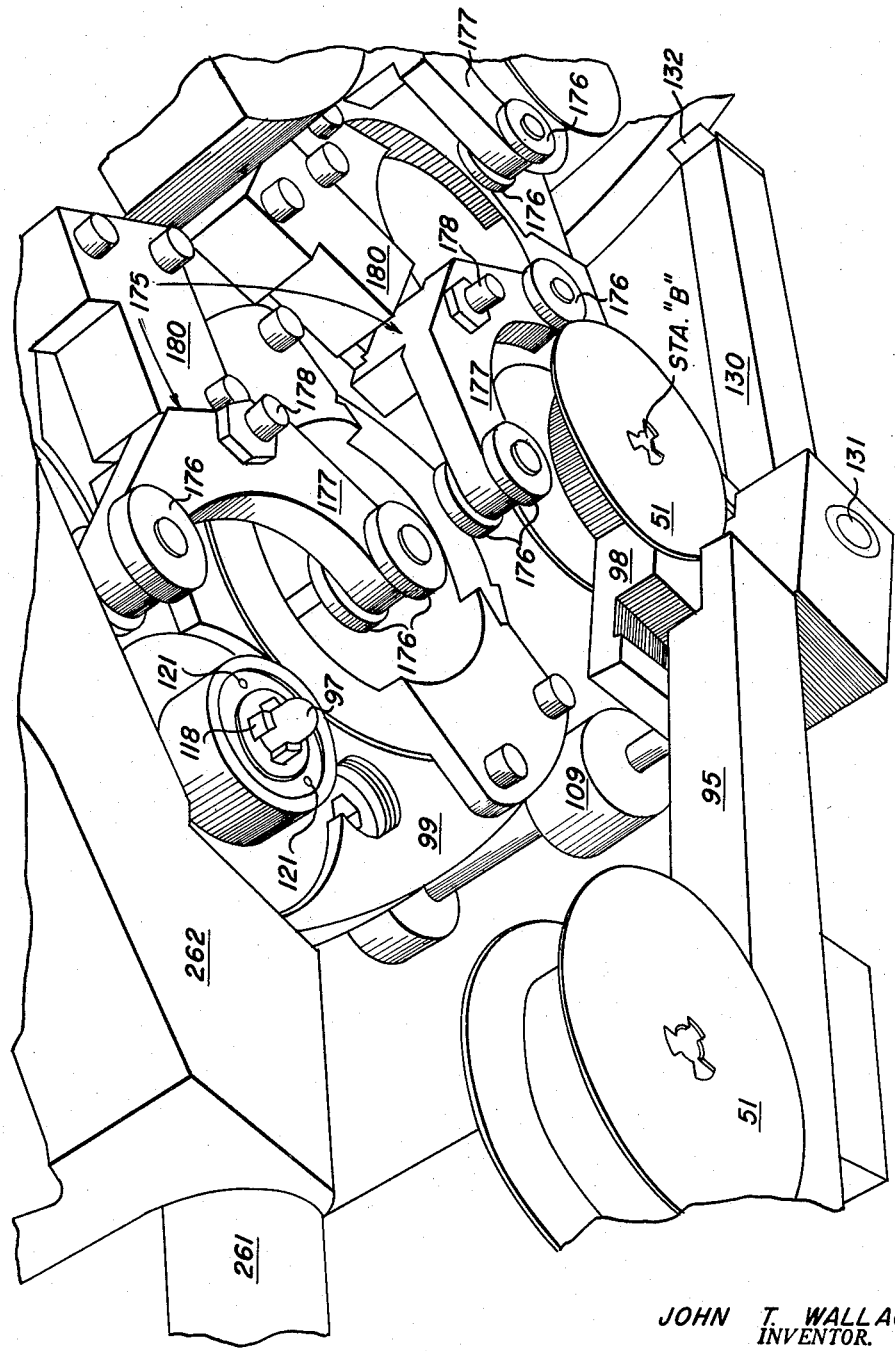

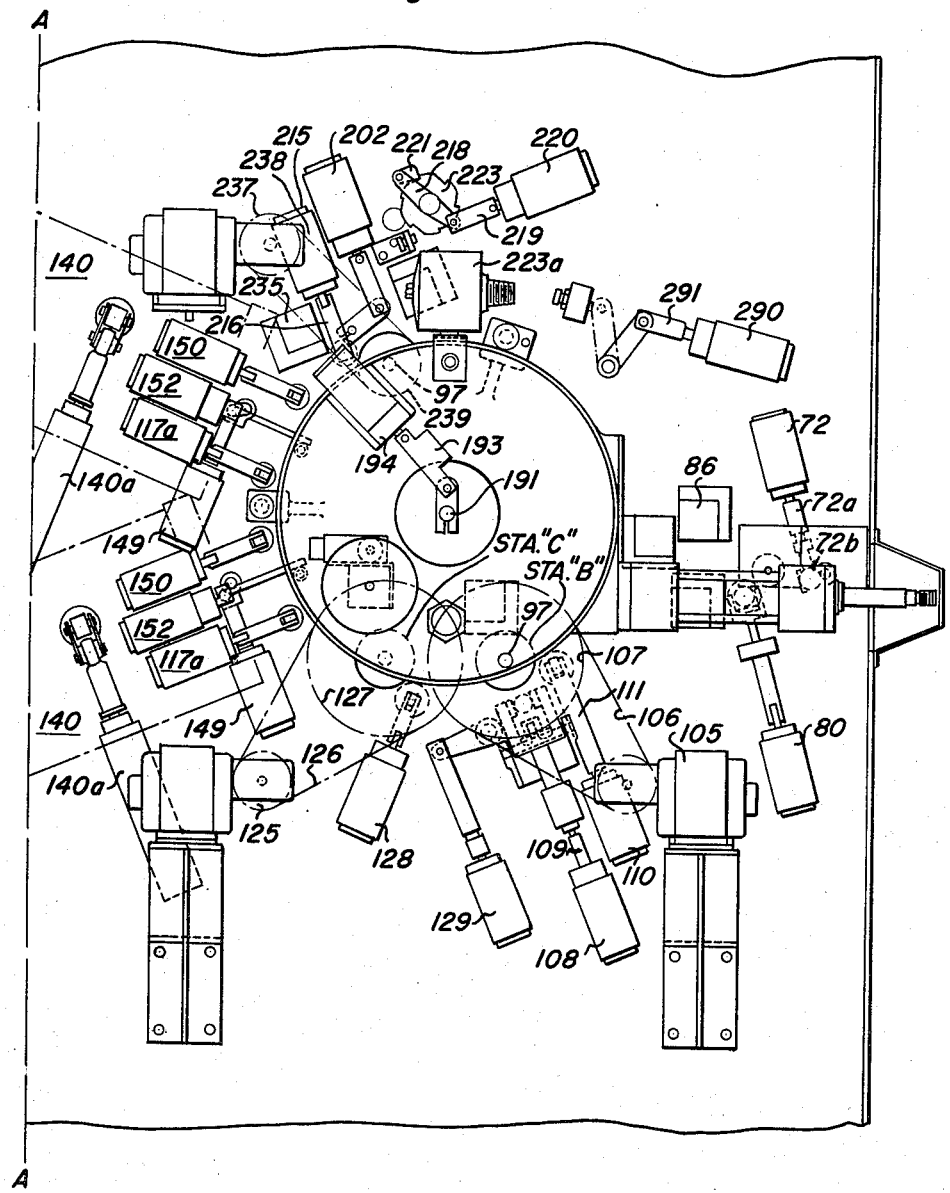

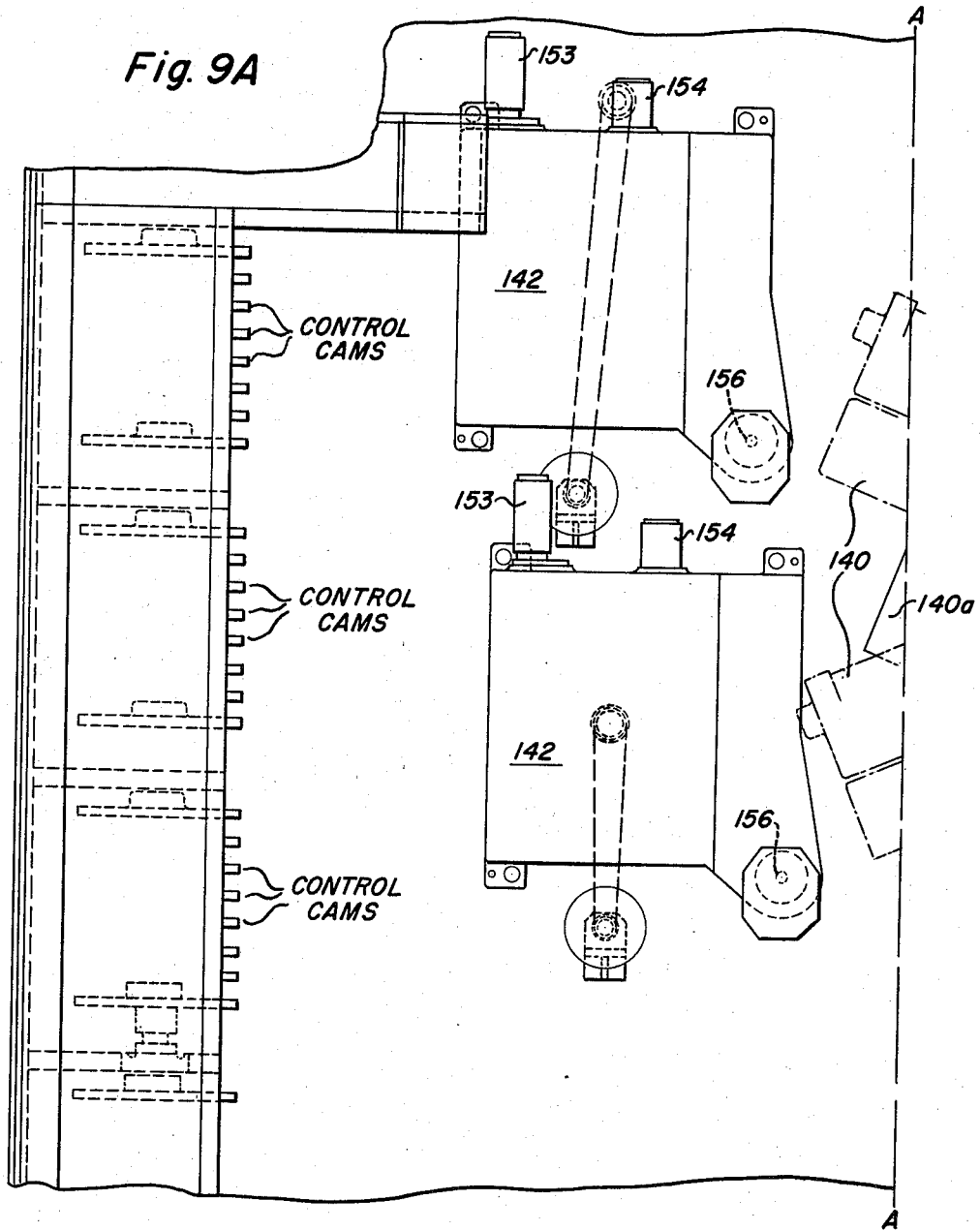

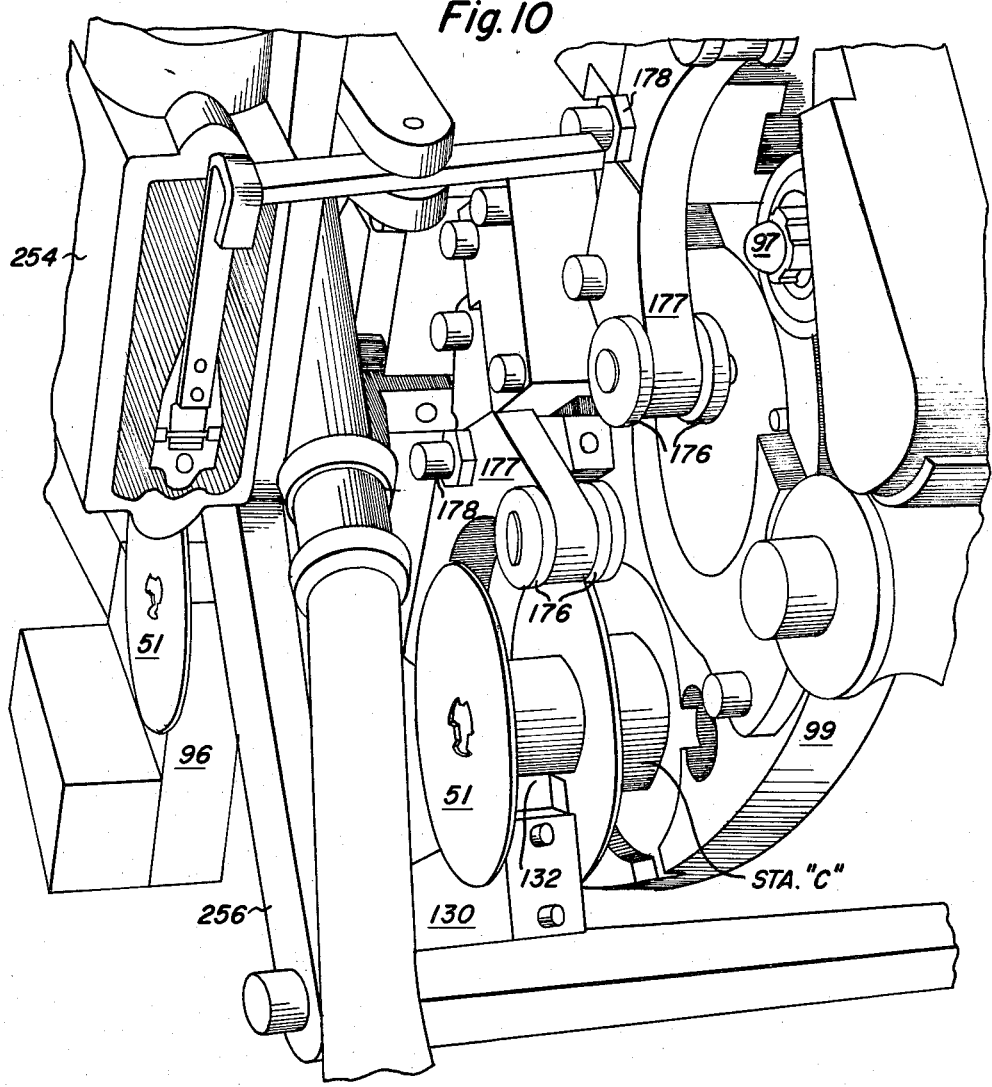

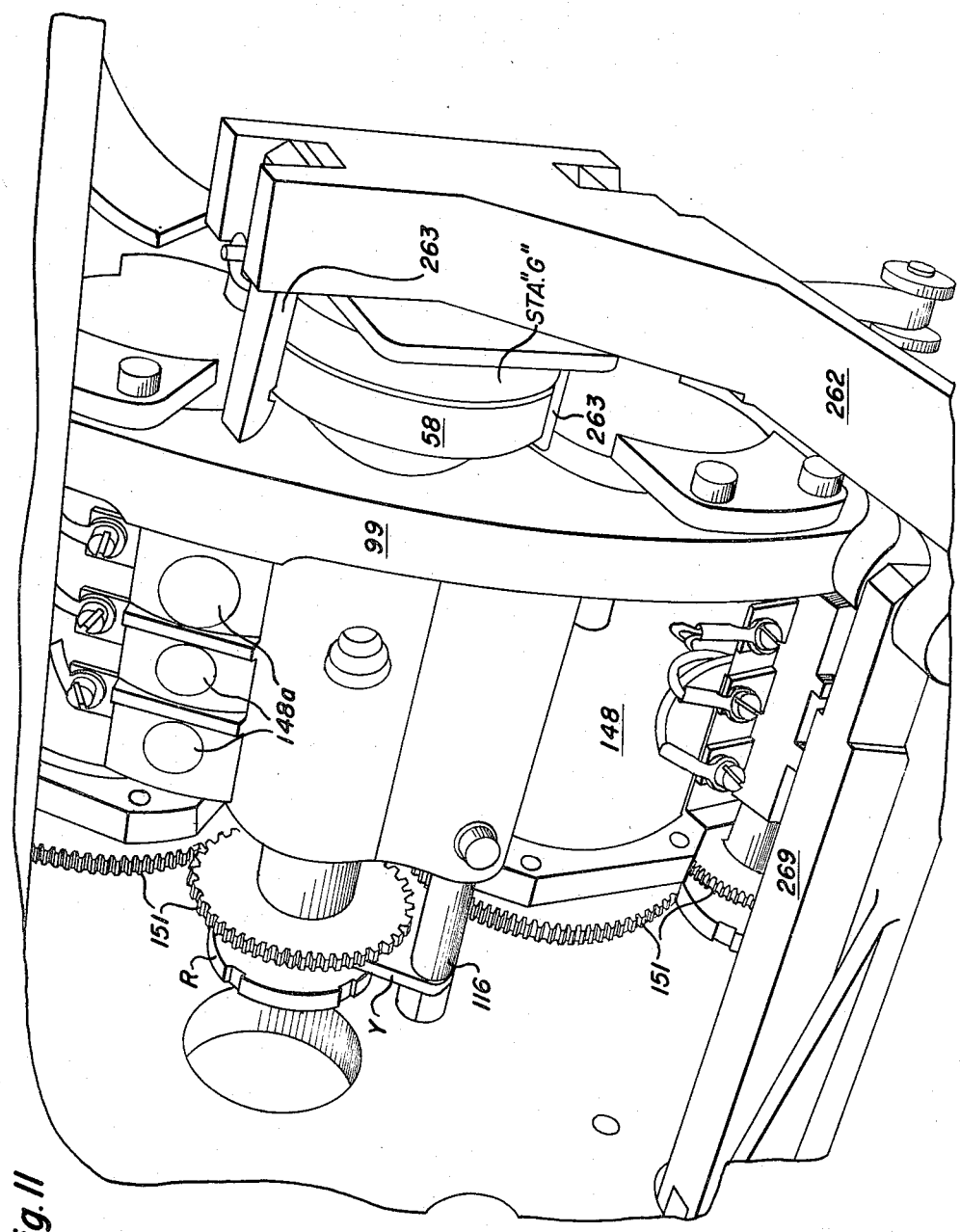

Feb. 16, 1960   J. T. WALLACE   2,924,921
AUTOMATIC SPOOLING MACHINE FOR 8 MM. FILM
Filed July 18, 1957   26 Sheets-Sheet 11

JOHN T. WALLACE
INVENTOR.

BY
ATTORNEYS

Feb. 16, 1960                J. T. WALLACE                2,924,921
            AUTOMATIC SPOOLING MACHINE FOR 8 MM. FILM
Filed July 18, 1957                              26 Sheets-Sheet 12

JOHN T. WALLACE
   INVENTOR.
BY
                ATTORNEYS

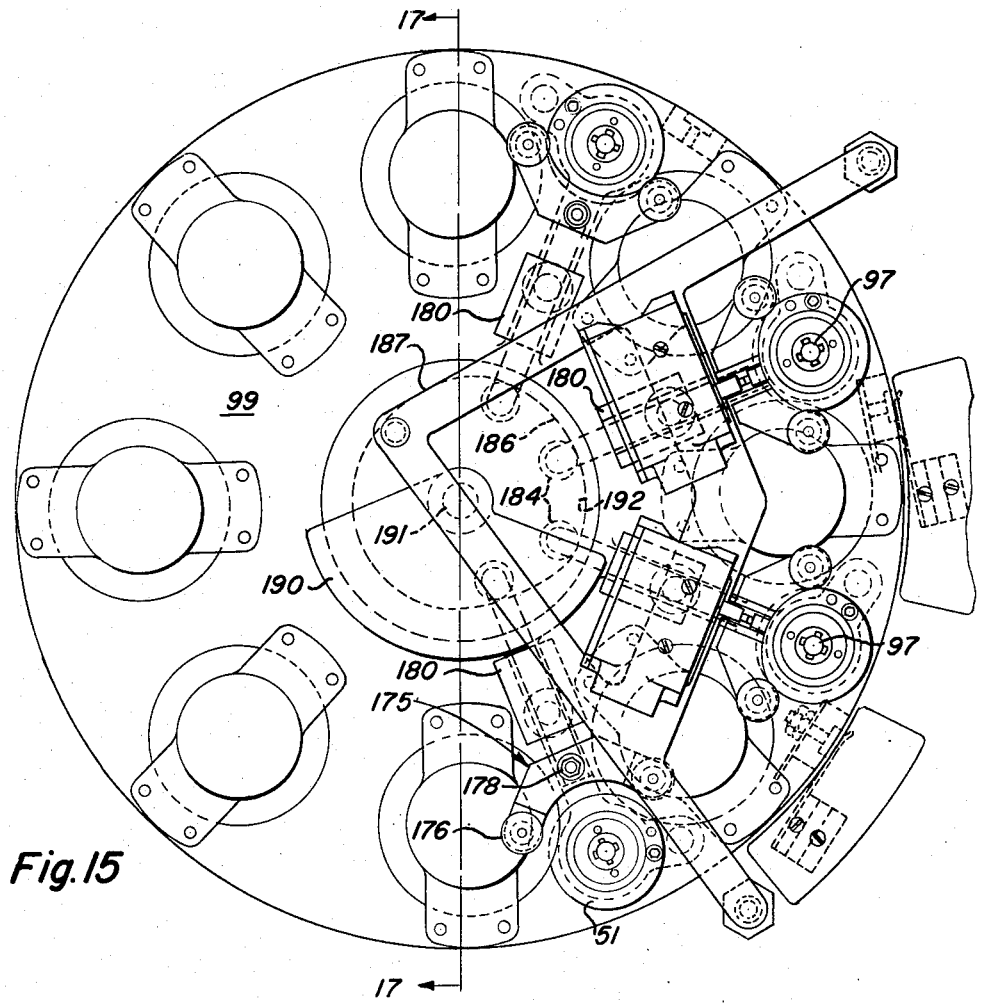
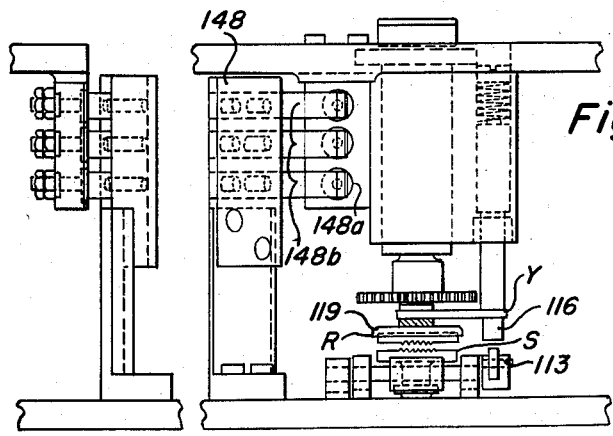

JOHN T. WALLACE
INVENTOR.

BY

ATTORNEYS

Feb. 16, 1960     J. T. WALLACE     2,924,921
AUTOMATIC SPOOLING MACHINE FOR 8 MM. FILM
Filed July 18, 1957     26 Sheets—Sheet 16

JOHN T. WALLACE
INVENTOR.

BY

ATTORNEYS

Feb. 16, 1960   J. T. WALLACE   2,924,921
AUTOMATIC SPOOLING MACHINE FOR 8 MM. FILM
Filed July 18, 1957   26 Sheets-Sheet 17

JOHN T. WALLACE
INVENTOR.

BY
ATTORNEYS

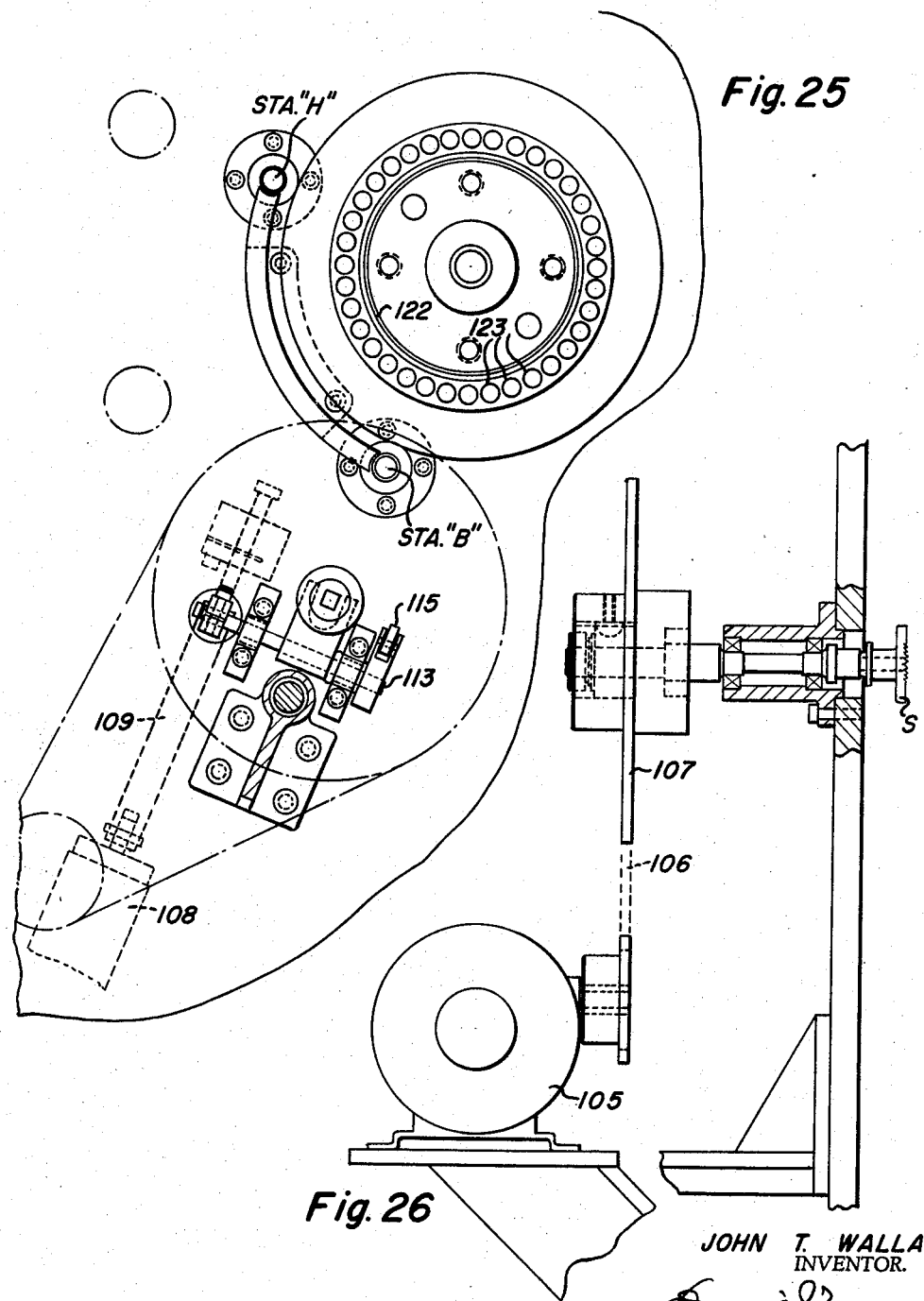

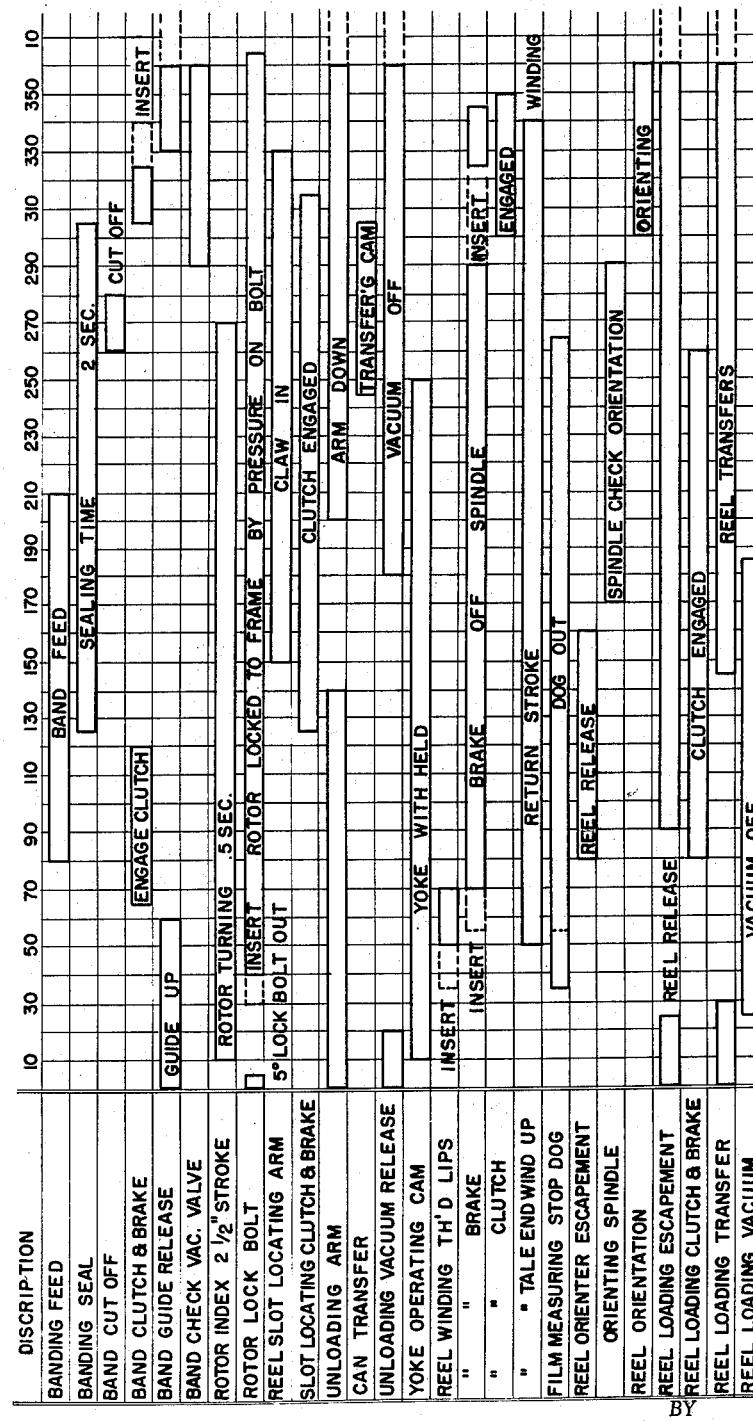

Feb. 16, 1960 J. T. WALLACE 2,924,921
AUTOMATIC SPOOLING MACHINE FOR 8 MM. FILM
Filed July 18, 1957 26 Sheets-Sheet 22

JOHN T. WALLACE
INVENTOR.

BY

ATTORNEYS

Feb. 16, 1960     J. T. WALLACE     2,924,921
AUTOMATIC SPOOLING MACHINE FOR 8 MM. FILM
Filed July 18, 1957     26 Sheets-Sheet 23

JOHN T. WALLACE
INVENTOR.

BY

ATTORNEYS

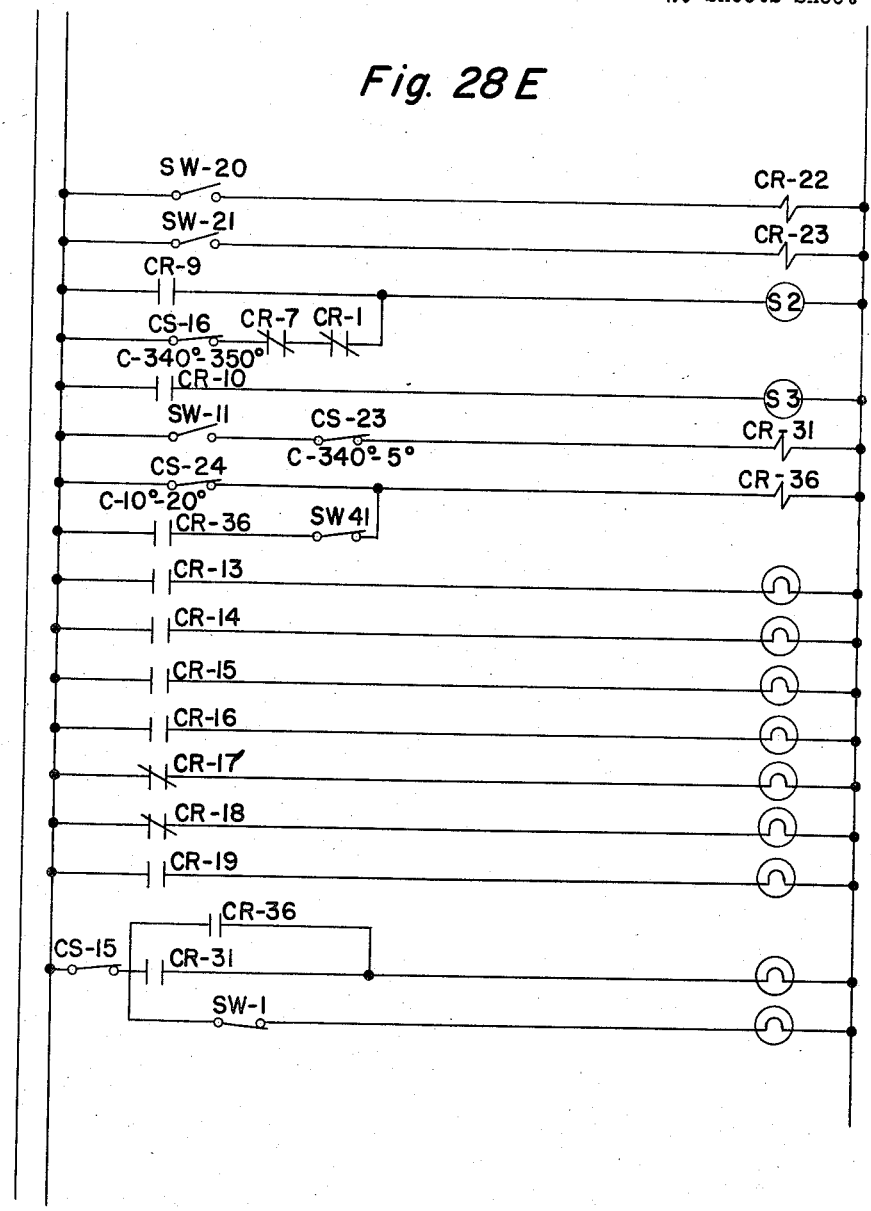

United States Patent Office 2,924,921
Patented Feb. 16, 1960

2,924,921

AUTOMATIC SPOOLING MACHINE FOR 8 MM. FILM

John T. Wallace, Rochester, N.Y., assignor to Eastman Kodak Company, Rochester, N.Y., a corporation of New Jersey Application July 18, 1957, Serial No. 672,748

13 Claims. (Cl. 53—54)

The present invention relates to improvements in winding machines, and more particularly to a new and improved spooling machine for winding automatically a strip of 16 mm. film onto a spool. After film is wound, it is provided with a band which holds the film in place on the spool. A can body or bottom is wiped over the spool and the can body is later capped with a suitable closure member. After processing, this film is slit lengthwise in half to provide two strips of 8 mm. film which are spliced end-to-end in a well known manner to provide the well known 8 mm. film.

This machine relates to winding film for use in an 8 mm. Cine camera. As is well known, the film used in such cameras is actually 16 mm. wide with a row of perforations along each edge. When exposing in a camera, only one-half of the width of the film is exposed at a time; the film is then reversed and the other half exposed. The film is processed and slit in two to a width of 8 mm., then spliced end-to-end to make a film 8 mm. wide with a single row of perforations along one edge only. Thus, the final film is 8 mm. wide, but the film which is wound for use in the camera is actually 16 mm. in width. It is this 16 mm. film which is actually wound by the device of the present invention.

The machine under consideration accomplishes the following operation:

(1) Winds the desired length of properly coated and perforated Cine film on a conventional spool carrier of conventional design;

(2) Winds, seals and tucks under a length of protective band which is bent over the film wound on the spool;

(3) Places the spool of banded film within a container of conventional design; and (4) Ejects the container with the spool of film in place onto a conveyor which transports the product to a capping operation.

The machine is briefly described as follows:

The film can bottoms are fed from a suitable source of supply along a conveyor to a point on the machine where they are in position to receive the wound spool of film. Simultaneously, the spools are fed from another source of supply and along a conveying mechanism to a spool orienting station. At this point the spools are properly oriented to place a 4-spline opening in one flange toward the rotor spindle to permit the spool to be properly positioned and held on the rotor during the winding and subsequent operations. After orienting, the spools are fed along a track to a spool loading station where the oriented spools are successively loaded onto succeeding spindles of an indexing rotor or turret. After such loading, the turret is indexed one station to bring the oriented spool to a slot locating station where the slot in the spool hub is properly positioned so as to receive the film at a subsequent winding station. Then, the turret is again indexed to move the oriented spool with its positioned slot, to a winding station where the film is fed to position its leading end in the hub slot, and the spool is then rotated to wind a predetermined length of film. The turret is again indexed to move the spool with its wound film to a banding station where a band is wrapped around the wound film, and the ends of the band are adhesively secured together so as to enclose the wound film in position on the spool. The turret is again indexed to another station to bring the spool with its wound film into position to wipe a can body over the wound spool of film. The next indexing of the turret serves to eject the can bottom with its wound film spool from the rotor. The can bottom, with its wound film, is then moved by means of suitable conveyors to a position to receive a can cover. Dual means are provided for rotating the spool and its supporting spindle at the various stations. The particular drive depends on the operation to be performed at the individual station, as will be later described.

The invention has as its principal object the provision of a machine for winding automatically a length of Cine film and then placing the wound film into a can.

A further object of the invention is the provision of a mechanism for moving the film spool to various stations progressively so the various operations may be performed in a definite, timed sequence.

Still another object of the invention is the provision of a novel means for properly orienting the film spools as they are fed to the machine.

Another object of the invention is the provision of a novel mechanism for applying a band to the wound film.

And yet another object of the invention is the provision of a novel arrangement and mechanism for wiping a can body over the wound film spool, and then ejecting the can with its film from the machine.

And still another object is the provision of dual independent drive means for rotating the spool-carrying spindle.

And yet another object of the invention is the provision of a machine of this type which is automatic in its operation, requires a minimum of attention on the part of the operator, and positive in its results.

To these and other ends the invention resides in certain improvements and combinations of parts, all as will be hereinafter more fully described, the novel features being pointed out in the claims at the end of the specification.

In the drawings:

Fig. 1 is a top perspective view showing the relation of the wound and banded spool to the can bottom, and showing the 4-spline spool flange;

Fig. 2 is an end view of the film spool on which the film is to be wound, showing the 3-spline spool flange;

Fig. 2A is a front view of the spool, showing the spool core or hub and the core slot;

Fig. 3 is a view of the can top or closure member in inverted position and with its sealing tape;

Fig. 5 is a perspective view of the spool orienting station, station A, Fig. 4, showing the relation of the various parts.

Fig. 6A is an end view of the mechanism illustrated in Fig. 6, showing the relation of the escapement mechanism, and the relation thereof to the orienting device;

Fig. 8 is a slightly perspective view of the spool loading station B, Fig. 4, showing the relation of the various parts;

Figs. 9 and 9A together constitute a partial view of the back of the machine showing the relation of the various control cylinders and their connecting linkages and a schematic showing of the control, for the purpose of clarity, the oil lines to the various cylinders having been omitted, but such an arrangement is clearly shown in the Edwards et al. Patent No. 2,776,094.

Figure 4:
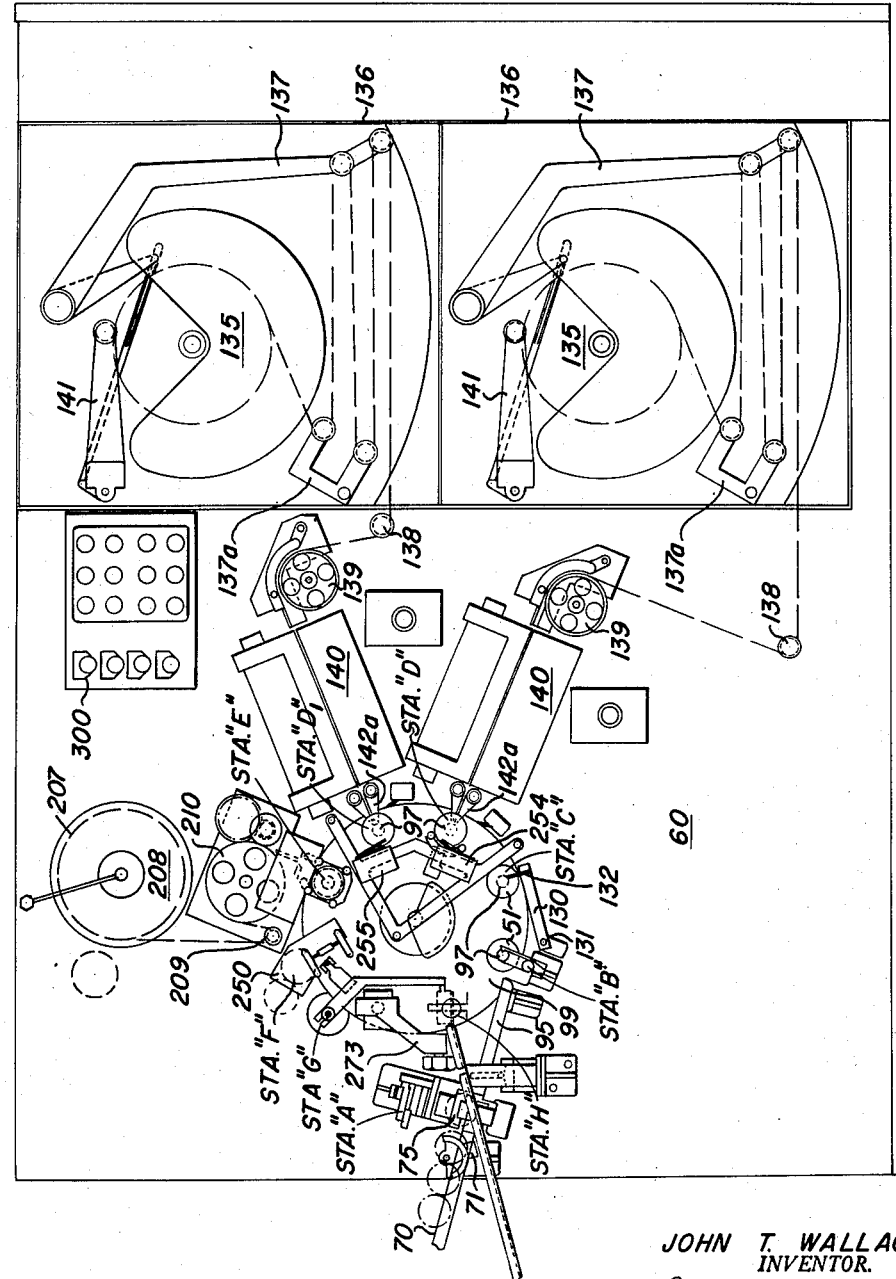
Fig. 4 is a direct front view of the machine, showing the relation of the rotor and the various spool stations.
Figure 12:
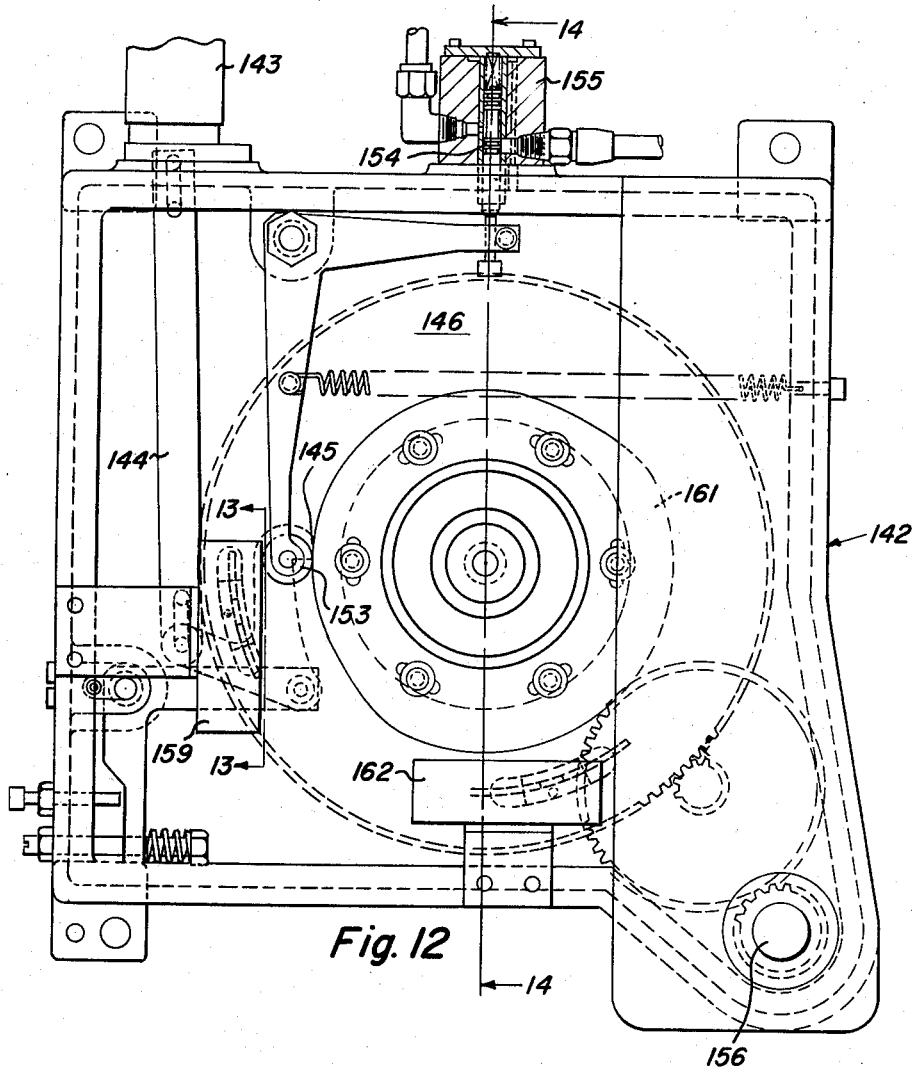
Figure 13:
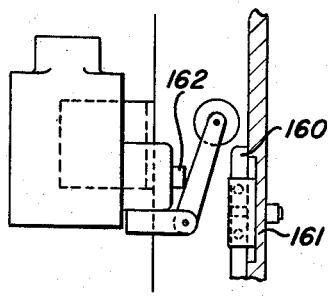
Figure 14:
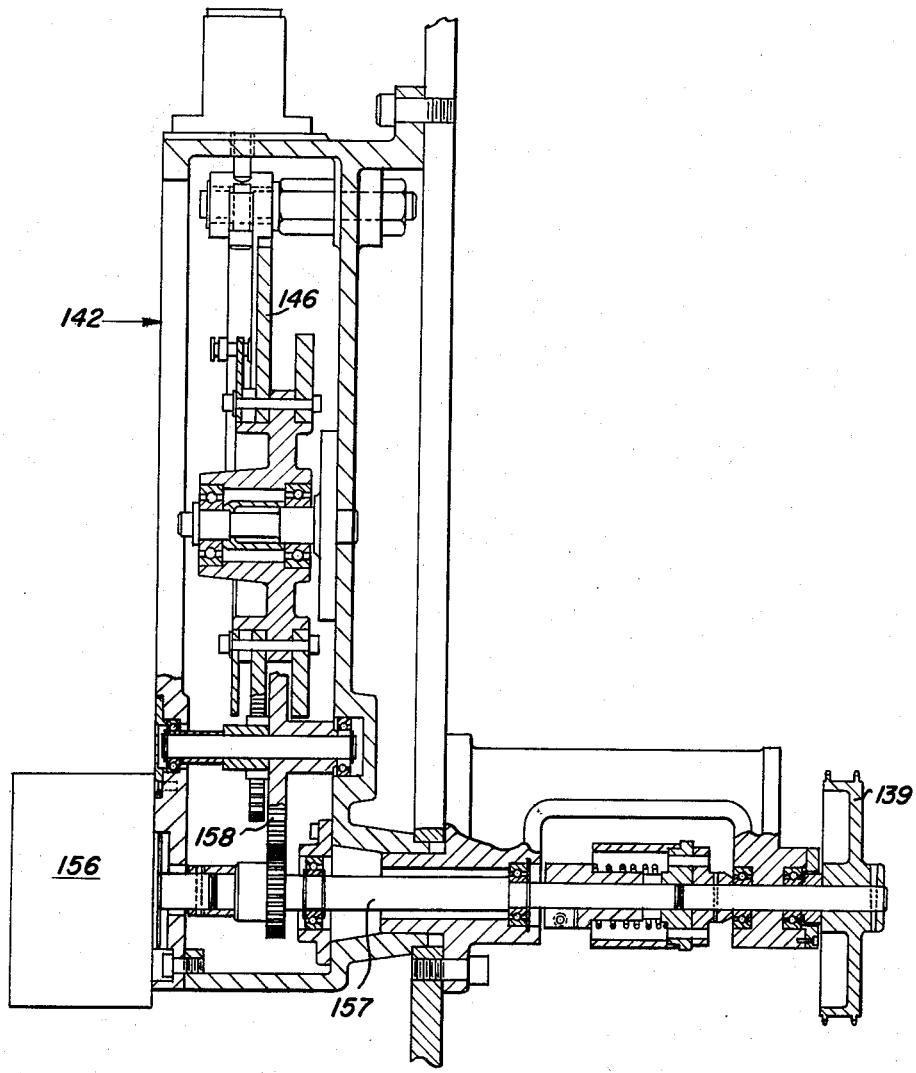
Figure 17:
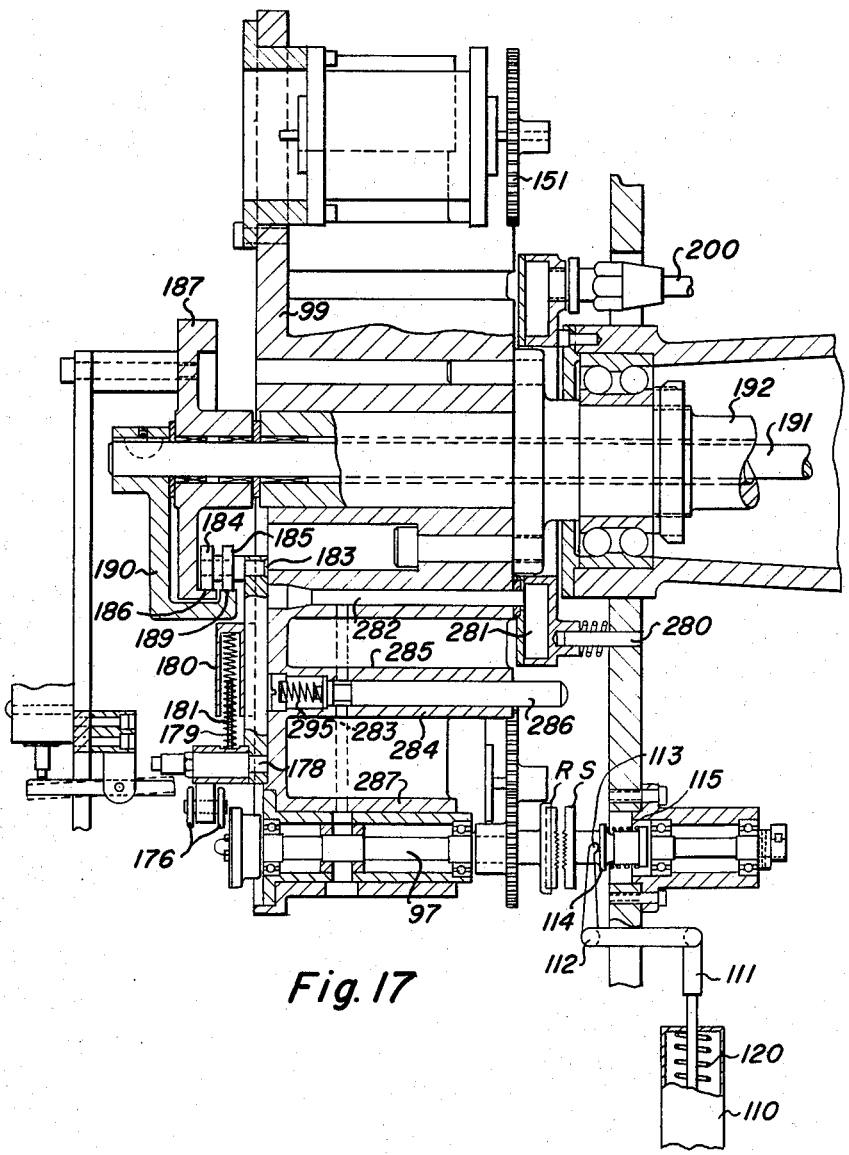
Figure 18:
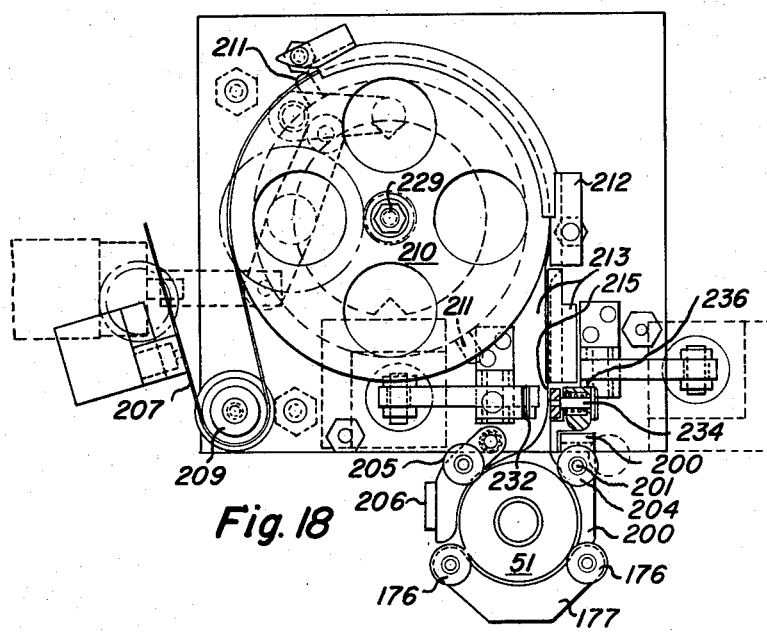
Figure 19:
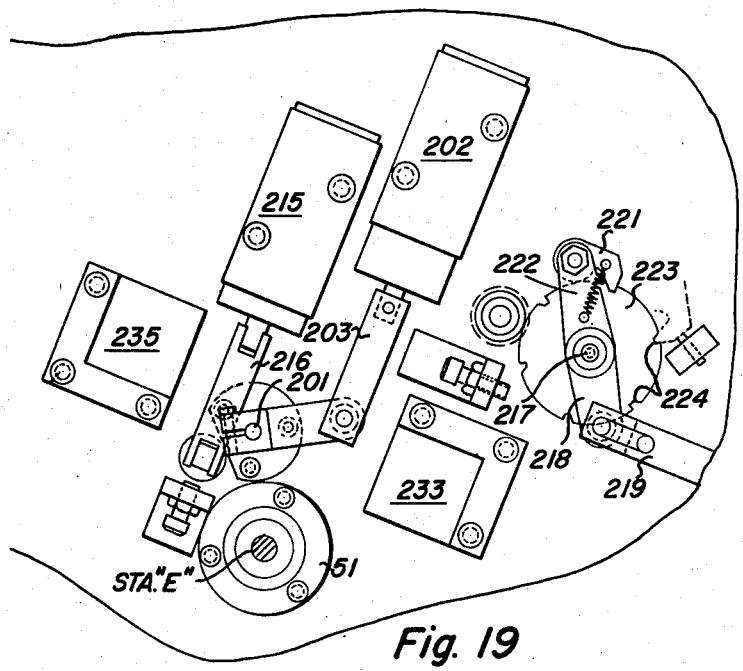
Figure 20:
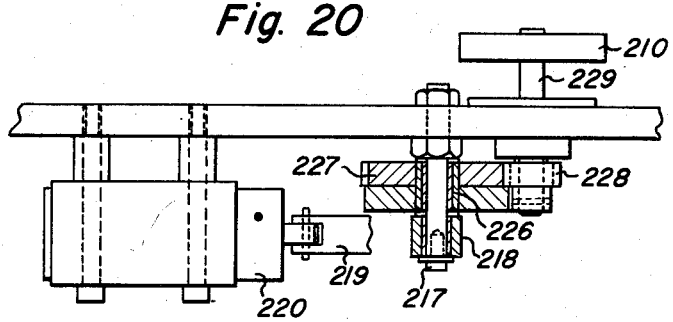
Figure 21:
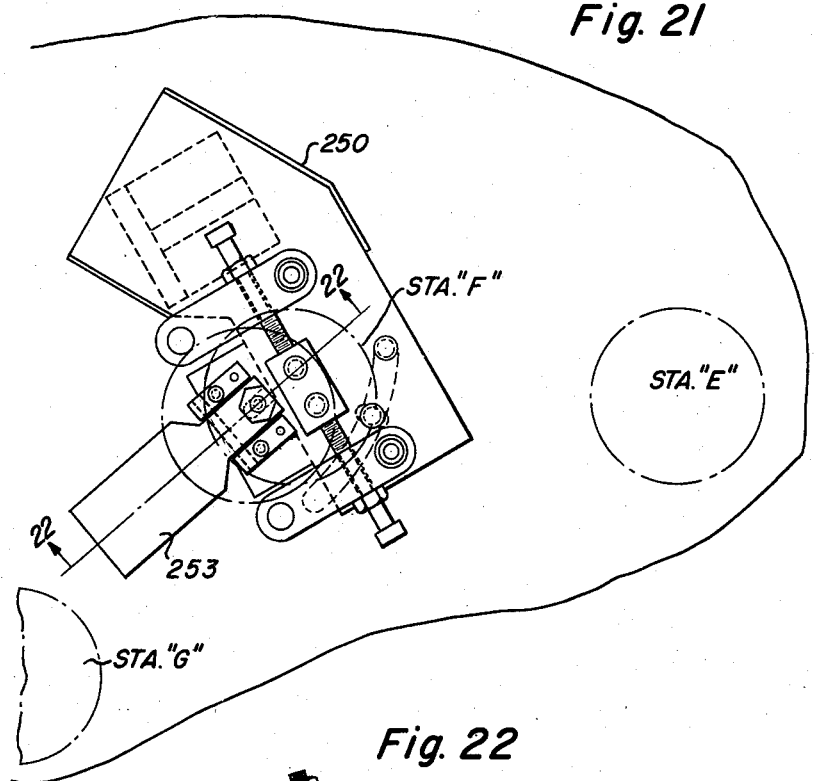
Figure 22:
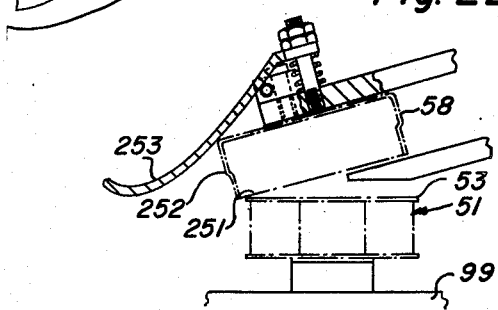
Figure 23:
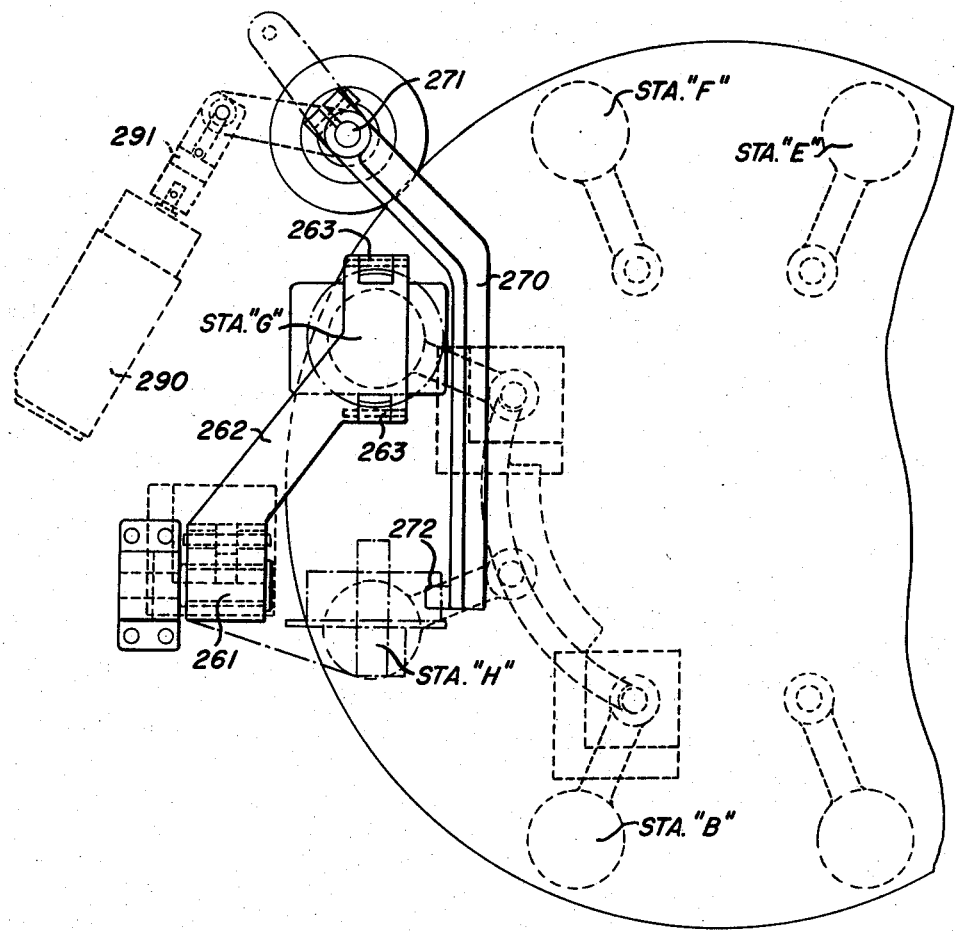
Figure 24:
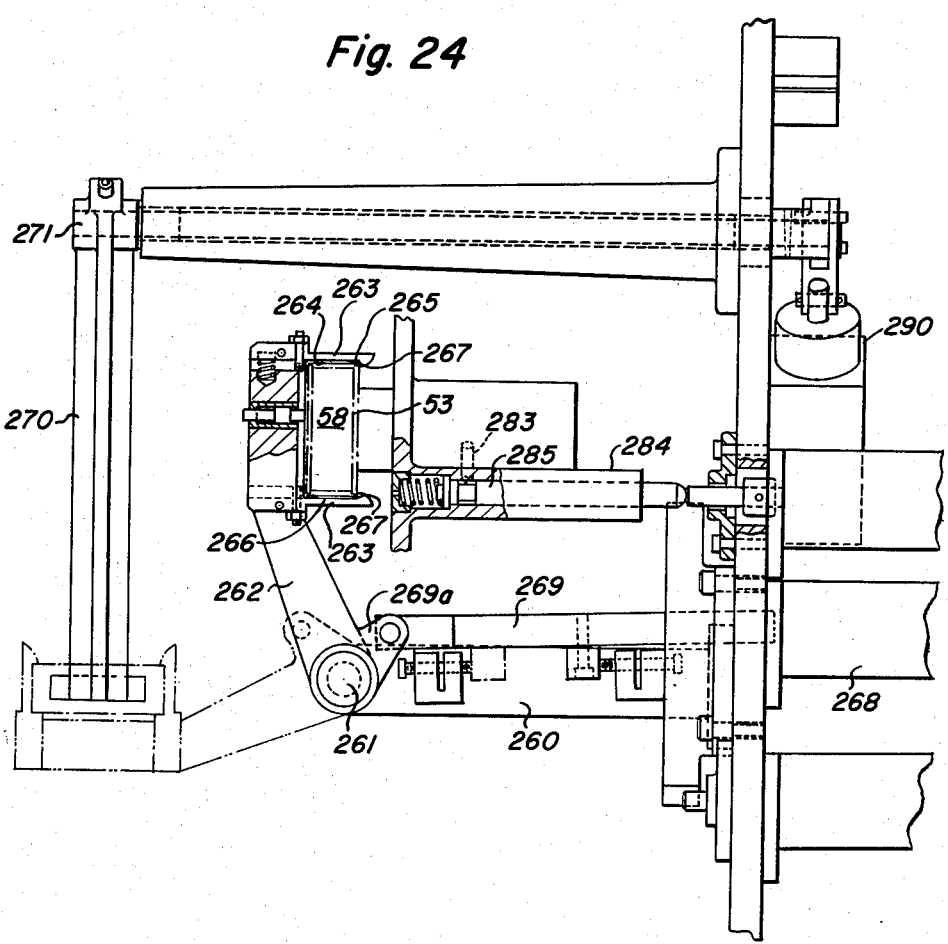

Fig. 10 is a right end view of the slot locating station, station C, Fig. 4, showing the relation of the parts;

Fig. 11 is an edge view of the rotor, showing the relation of the auxiliary winding motor and the clutch and brake mechanism;

Fig. 12 is a front view of the film metering device, showing the control switch for the torque motor;

Fig. 13 is a sectional view taken substantially on line 13—13 of Fig. 12, showing the details of the switch mounting;

Fig. 14 is a vertical sectional view taken substantially on line 14—14 of Fig. 12, showing the shaft connection to the metering wheel;

Fig. 15 is a front view of the rotor, showing the controls for the yokes and the fixed and movable cam;

Fig. 16 is an edge view of the rotor, showing the relation of the torque motor unit;

Fig. 17 is a vertical sectional view taken substantially on line 17—17 of Fig. 15, showing the spindle clutch and the arrangement of the parts which control the yokes;

Figure 18 is a front view of the banding station, station E, showing the various elements;

Fig. 19 is a back view of the mechanism illustrated in Fig. 18;

Fig. 20 is a horizontal sectional view taken substantially on line 19—19 of Fig. 17, showing the relation of the cylinder to operate the metering wheel;

Fig. 21 is a partial front view of the rotor at station F, showing the relation of the can bottom chute thereto;

Fig. 22 is a partial sectional view taken on line 22—22 of Fig. 21 showing the wiping action of the film spool into the can bottom;

Fig. 23 is a partial view of the rotor at station G, showing the can and spool unloading assembly;

Fig. 24 is a right-hand view of Fig. 23, with parts in section, showing the means for removing the can bottom and the wound and banded spool from the rotor spindle;

Fig. 25 is a rear view of the rotor, showing the relation of the operating elements at the various stations, and the vacuum porting and venting arrangement for the rotor.

Figure 27:
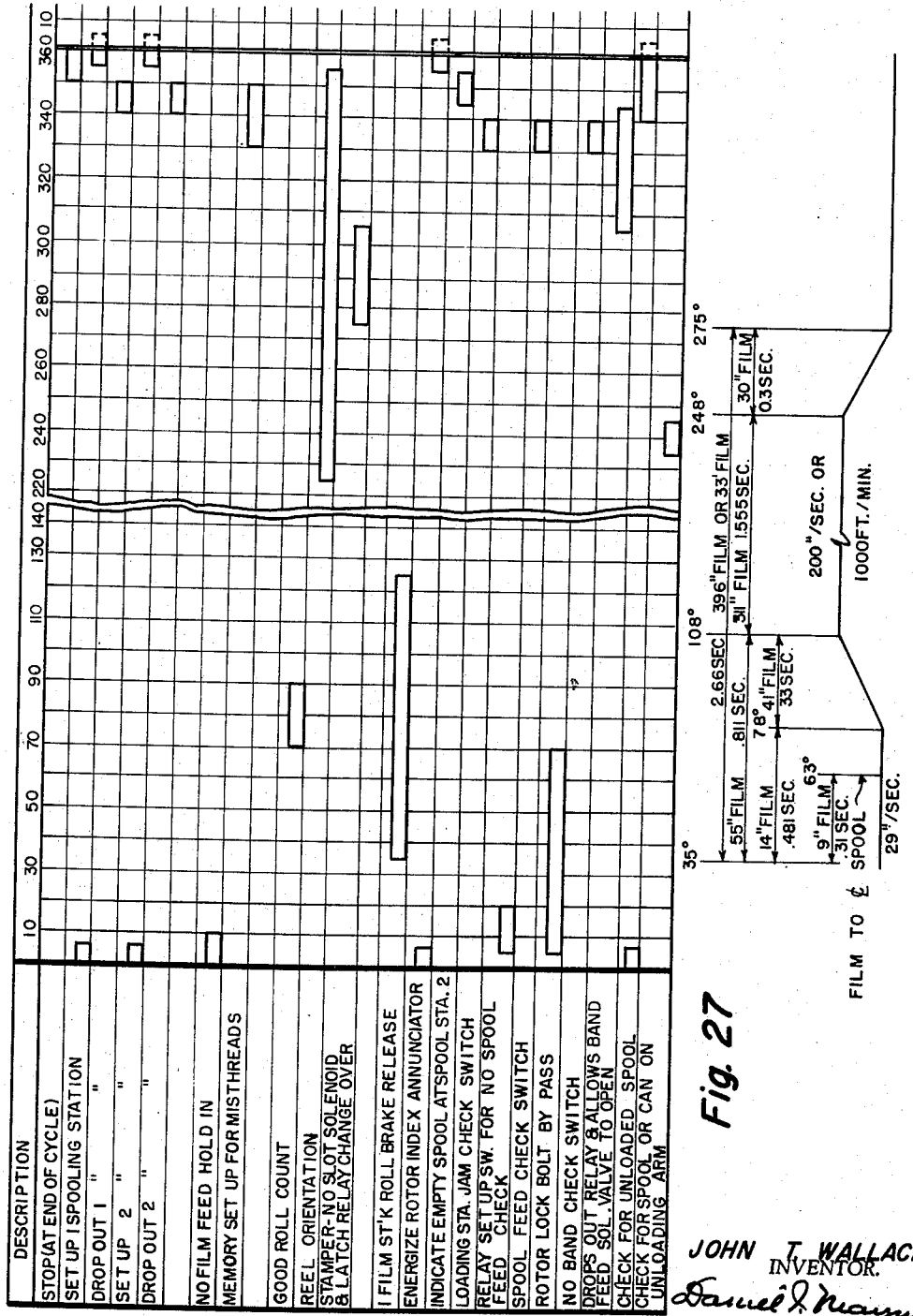

Fig. 26 is a side view of the motor drive connection to the rotor spindle clutch;

Figs. 27 and 27A constitute the timing chart for the machine, and

Fig. 28A–E constitutes the machine wiring diagram.

Similar reference numerals throughout the various views indicate the same parts.

The general purpose of the machine is for the winding of a measured length of film from a web automatically onto a spool 51 of conventional design, Fig. 1, and then severing the wound length of film from the supply. This spool 51 is provided with opposite end flanges 52 and 53, one of which, 52, is provided with a 3-spline opening, 54, and the other, 53, is provided with a 4-spline opening, 55 as shown in Figs. 1, 2 and 2A. After the length of film is wound onto the spool, a band 56 is wrapped around the wound film and the ends 57 of the band are adhesively secured together. The adhesively secured ends are then folded or rolled down against the band, as shown in Fig. 1, and the wound film with its band is then placed in a can bottom 58 of the type shown in Fig. 1. The wound film with its can bottom is then moved to a conveying mechanism where a cover 59, Fig. 3, is provided to close the can.

The machine of the present invention is cam-timed, hydraulically operated, and is provided with electrical interlocks and automatic stops of the general type shown and described in the Edwards et al. Patent No. 2,776,094, filed December 21, 1953, and issued January 1, 1957, to which reference may be had for details showing the description of the various cams, manifolds, cylinders and valves. As these elements do not constitute, per se, a part of the present invention they are not shown or described herein. The various cams, hydraulic manifold valves, cylinders and operating mechanisms, as shown diagrammatically in Fig. 9 of the present application and illustrated in Figs. 4 and 5 of the Edwards patent, are mounted on the main machine panel 60, Fig. 4. The various elements which relate specifically to the present invention will be later described in more detail.

The can bottoms 58 are positioned in a haphazard manner in a hopper (not shown) of a can sorting machine hold under the trade name Capem, manufactured by Consolidated Packaging Machinery Company. The sorted can bottoms are then fed to an inclined conveyer (not shown) which directs the can bottoms 58 down a chute (not shown) to can loading station F, see Fig. 4. On the other hand, the film spools or reels 51 are supplied to a hopper of a spool sorting machine also manufactured by the above-mentioned company. The sorted spools are then fed to a conveyor, which feeds the spools to an inclined track 70 to the film orienting station A.

The conventional spools 51, Fig. 1, are fed by gravity down the inclined track 70, see Fig. 4, and are cradled by an oscillating escapement member 71 ahead of the reel orienting station A. This cradle mechanism is actuated by a hydraulically controlled means, such as cylinder 72, Figs. 6A and 9, and linkage 72a pivoted at 72b to actuate the escapement mechanism 71, Fig. 6A in proper timed relation to the operation of the machine from a common cam-shaft of the type shown and described in the above-mentioned Edwards et al. patent.

*Spool orienting device—station A, Figs. 4, 5, 6, 7*

Figure 7:
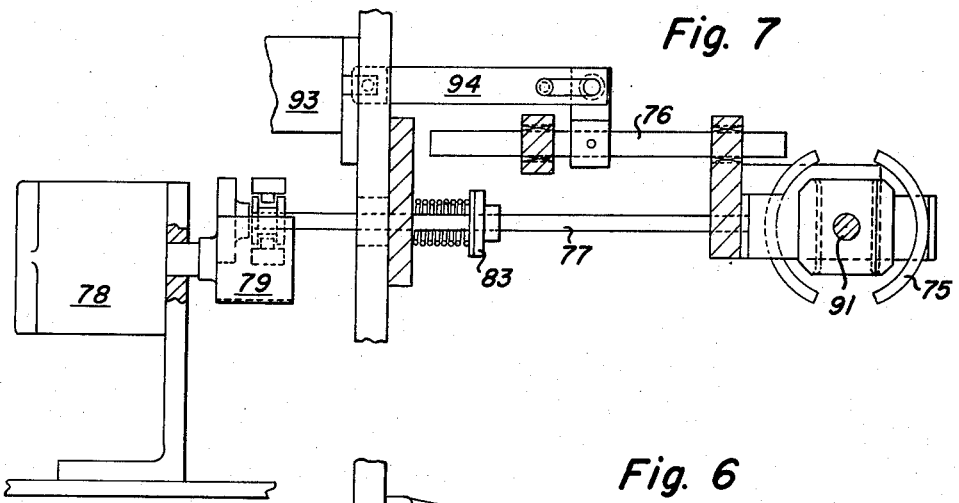
Fig. 7 is a top or plan view of the orienting mechanism illustrated in Figs. 5 and 6, and taken on line 7—7 of Fig. 6.
Figure 6:
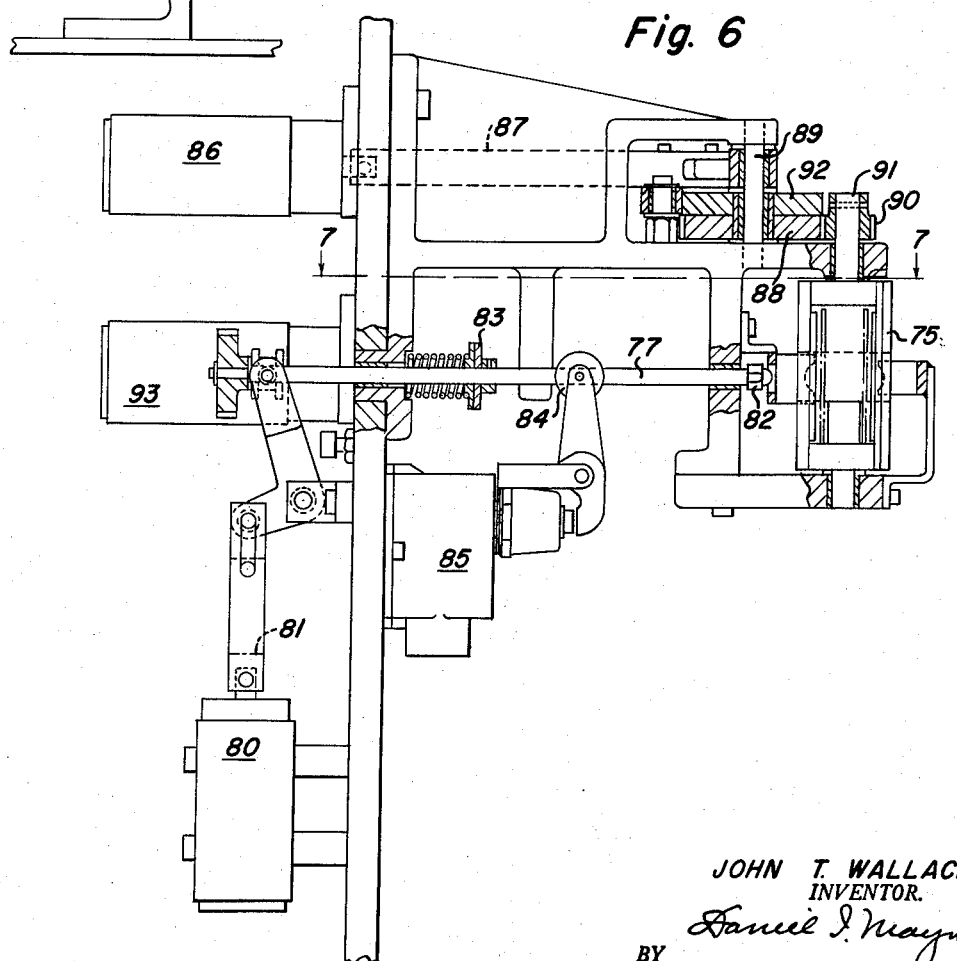
Fig. 6 is a vertical sectional view through the spool orienting mechanism illustrated in Fig. 5, and taken on line 6—6 of Fig. 6A.

Referring to Figs. 5 and 7, when the spool enters a rotatable spider 75, it is held there by a stop bar 76, Fig. 7, which passes across in front of the spool to retain the latter while an orienting pilot bar 77, Figs. 6 and 7, is moved toward the spool. The bar 77 is rotated continuously by a motor 78, Fig. 7, through a gear coupling 79 which both rotates bar 77 and enables the latter to be moved axially. Such axial movement of the bar 77 is secured by a cylinder 80 and linkage 81, Fig. 6. The right end of the pilot bar 77, see Fig. 6, is provided with a 3-shoulder pilot 82, which is designed to enter the 3-spline opening 54 of the spool flange 52. If the spool is positioned in the orienting device with the 3-spline opening toward member 82, the latter can enter the 3-spline opening and the member 82 will be moved to the right as viewed in Fig. 6 by cylinder 80. Such movement causes an adjustable stop 83 to engage the roller and lever 84 of a microswitch 85 (SW—10).

Figure 28A:
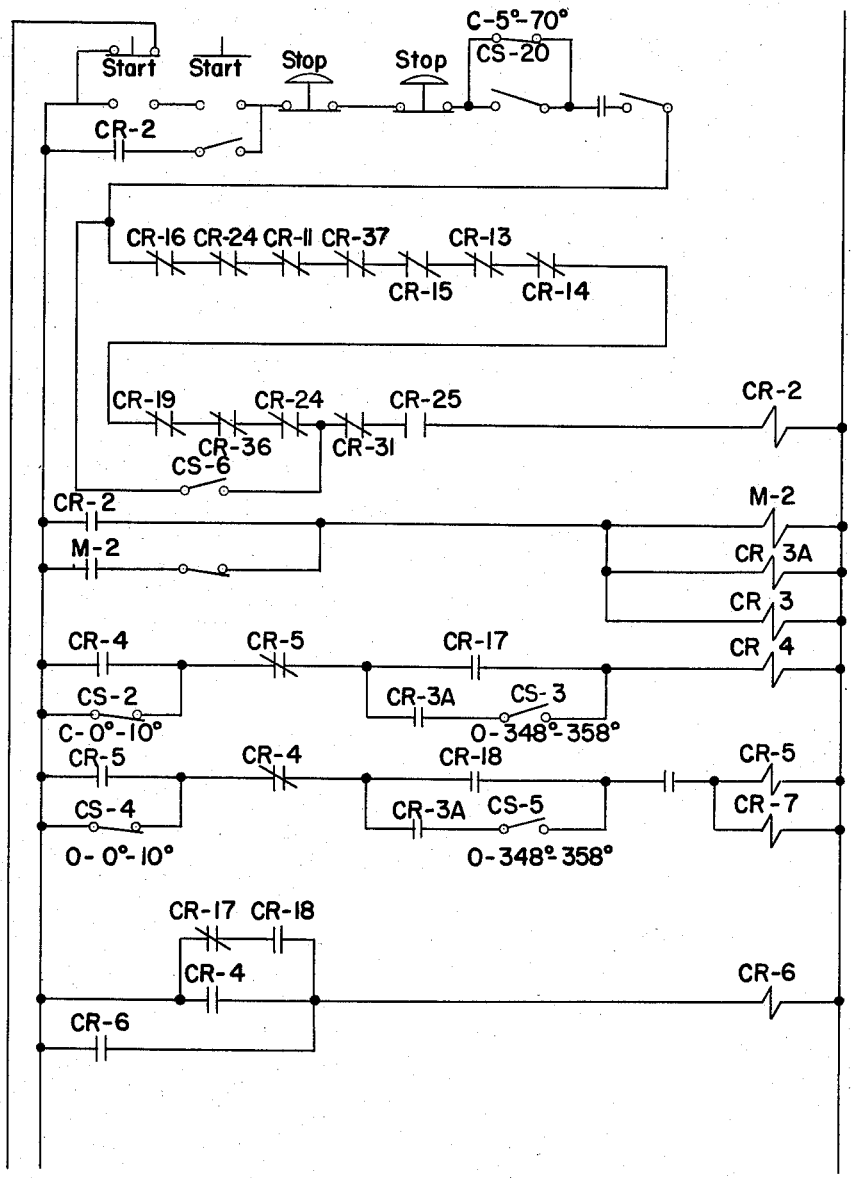
Figure 28B:
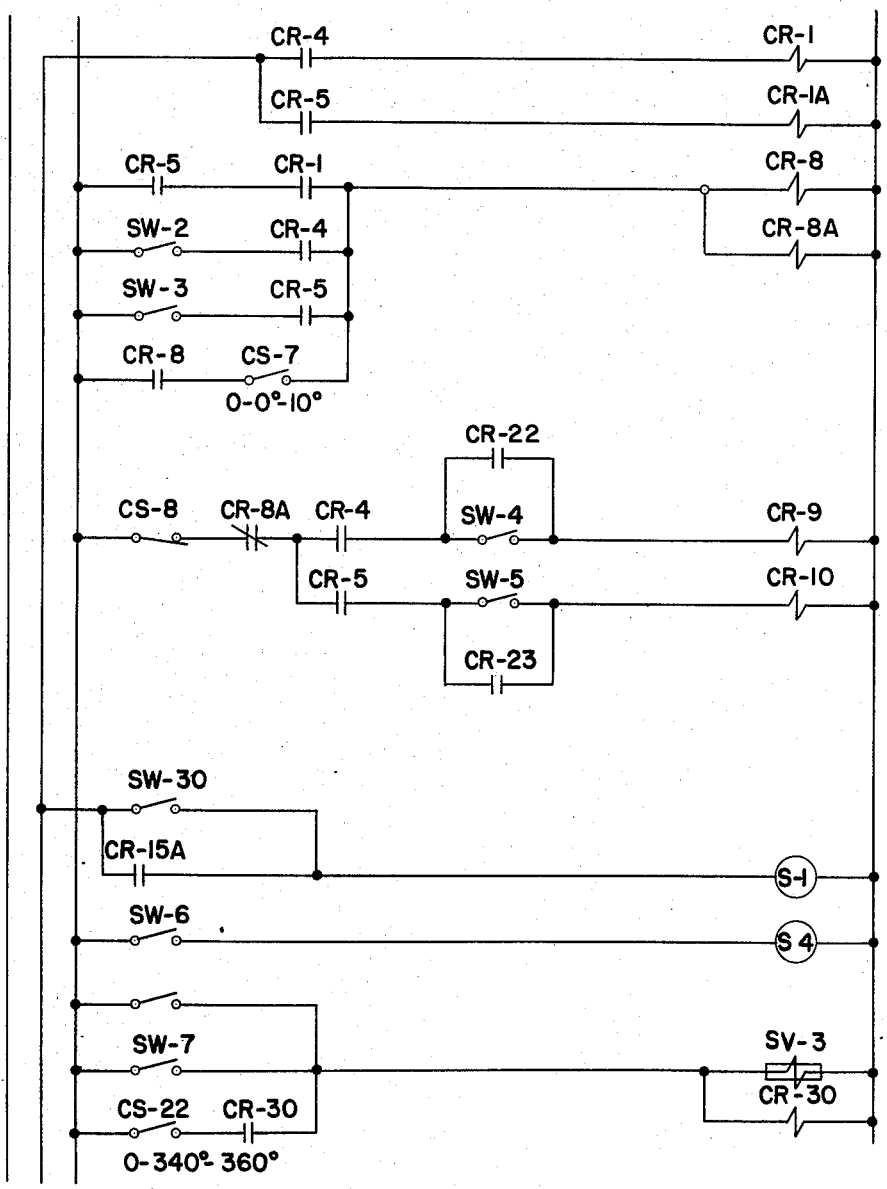
Figure 28C:
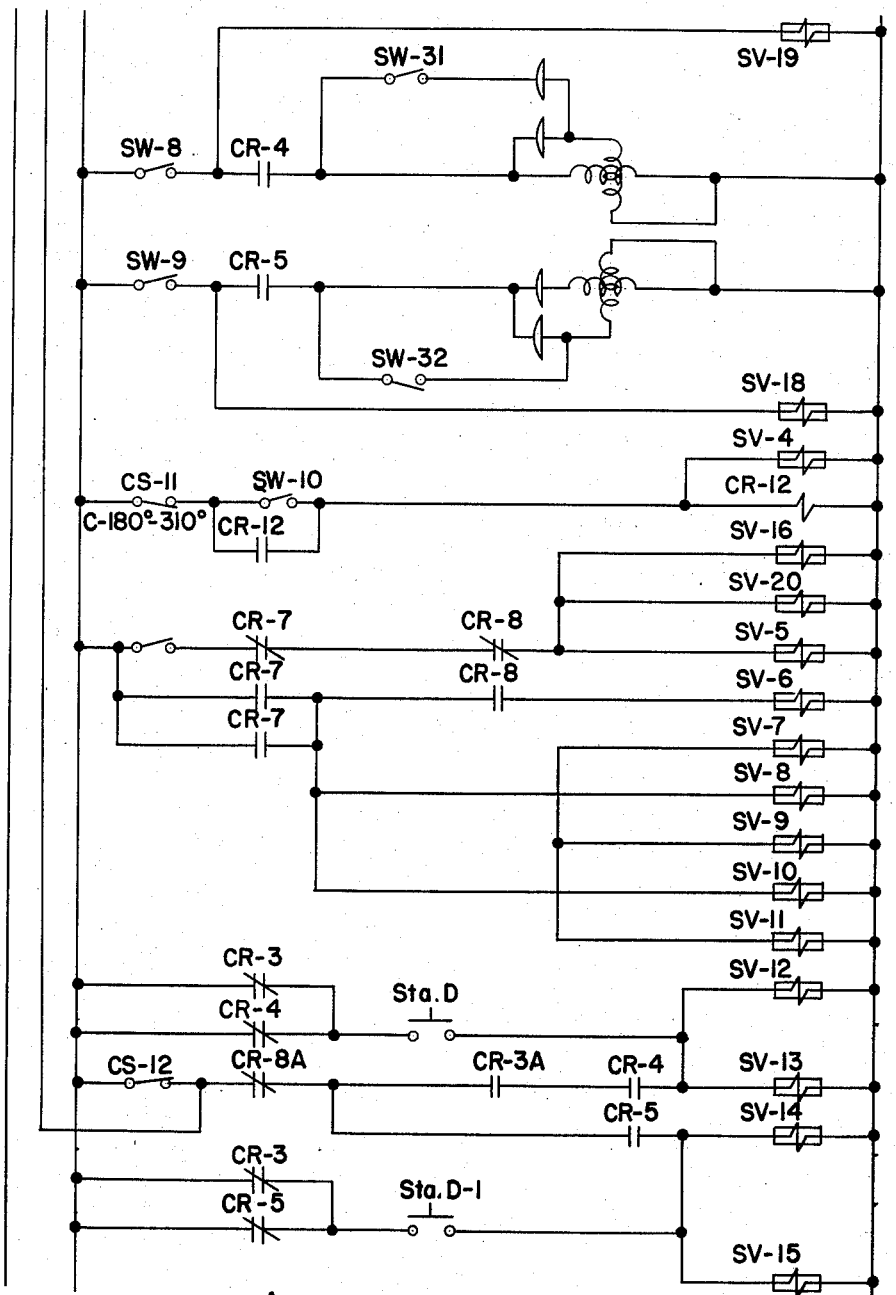

With reference to Fig. 28C, when cam timing switch CS–11 closes at 180°, and spool orienting switch 85 (SW–10) is closed, the relay coil CR–12 is energized and its holding contact CR–12 closes the circuit to the spool orienting pusher solenoid valve SV–4. When the solenoid valve is energized, oil is ported to cylinder 86, Fig. 6, which causes linkage 87 to move and thereby actuates gear segment 88, best shown in Fig. 5, carried by shaft 89 to rotate gear 90 thus rotating the spider 75 about the axis 91 180° to bring the 4-spline opening on the spool flange facing the pilot bar 77. The spool is now properly oriented. The foregoing action is completed before the cam which actuates cam timing switch CS–11 reaches 310° in the operating cycle. At 310° in the cycle, a drop off on the lobe of the operating cam causes cam timing switch CS–11, Fig. 28C, to open, thereby dropping out relay CR–12 and de-energizing spool orienting pusher solenoid valve SV–4.

If, on the other hand, the 4-spline opening faces the 3-shoulder member 82, the latter cannot enter the 4-spline opening and the orienting spider 75 will not be rotated as the spool is in its proper oriented relation.

A pawl-and-ratchet arrangement 92, Figs. 5 and 6, is positioned on top of gear 88 to assure that the spool will always be in alignment with a rotatable spindle to be more fully described later. At 180° of cam shaft rotation, a manifold valve (not shown) is operated to port oil to cylinder 93, Fig. 7, thereby causing linkage 94 to be operated to retract stop bar 76 to move the latter out of the path of the spool in the orienting mechanism to allow the spool to roll freely down the guide 95, see Figs. 4 and 8, until the spool finally contacts a stop 96, see Fig. 10, which holds the spool 51 against further movement and in general alignment with one of the spindles 97, as best shown in Fig. 8, which is positioned at the spool loading station B, see Fig. 4. The spindle 97 is one of eight identical spindles which are mounted in equally spaced relation, 45° apart, around an indexing turret or rotor 99, as best shown in Fig. 15, which is carried by one end of a hollow shaft 192, Fig. 17, journaled in the main machine frame 60, Fig. 4, and having connected at the other end thereof an operating mechanism of the types shown in Figs. 12 and 13 of the Wallace et al. application Serial No. 577,585 filed April 11, 1956, which mechanism will index the rotor in 45° steps to move the spindle to the various stations at which different operations are performed in the winding, banding and canning of the film.

Spool loading station—station B, Figs. 4 and 8

The spool is moved out of alignment with track 95 and onto a spindle 97 at the loading station B. To secure this result, it is necessary first to impart rotation to spindle 97 so as to bring the lugs 118 on 97 into registry with the 4-spline opening 55 in the spool flange 53 to enable the latter to be positioned on the spindle 97, as will be presently described. This rotation is secured by energizing an electric motor 105, Fig. 9, which is mounted on the back of the machine. This motor 105 is connected to spindle 97 by means of a chain 106 and sprocket 107, see Fig. 9, which, in turn, are connected to clutch member S, Fig. 17, to rotate spindle 97. With the latter now rotating, the lower portion 98 of track 95, Fig. 8, is moved inward toward the rotor 99, to mount the spool 51 on the aligned rotor spindle 97 at loading station B. To move track portion 98, oil is ported to a convenient hydraulic cylinder 108, Fig. 9, through a suitable linkage 109 which, in turn, is connected to 98, Fig. 8, to move the latter inward to position the spool on aligned sprindle 97. Through a convenient manifold valve (not shown), and a hydraulically-operated valve mechanism in housing 285, Fig. 17, to be later described, vacuum is ported to spindle 97 at the loading station B.

Figs. 11 and 17 show the driven clutch R which is the equivalent of clutch member 146, Fig. 8, of the above-mentioned Wallace et al. application. Fig. 17 also shows the drive clutch member S which is the equivalent of member 149, Fig. 8, of the above cited Wallace et al. application. The clutch member S is spring-loaded to the left by spring 115, Fig. 17.

When oil is ported through a manifold valve (not shown) oil pressure is applied to spring-return cylinder 110, Fig. 17, which operates link 111 to rock shaft 112 counterclockwise, as viewed in Fig. 17, to rock yoke 113 similarly to move the yoke out of engagement with shoulder 114 to permit spring 115 to force clutch face S to the left, Fig. 17, and into engagement with clutch face R to connect spindle 97 to motor 105 to drive the spindle, as is deemed apparent from Fig. 17. Simultaneously, the rocking of shaft 112 moves yoke 113 to the left, as viewed in Fig. 16 and into contact with a spring-loaded shaft 116, Fig. 16, which is attached to a brake arm Y to move the latter out of engagement with the rear face 119 of clutch member R to release spindle 97 to permit the latter to be driven by motor 105. When the cylinder 110 is de-energized, a spring 120 within cylinder 110 will rock shaft 112 clockwise, Fig. 17, to shift the member S to the right to declutch S from R. Also, such movement of the shaft 112 will move yoke 113 out of engagement with 116 to allow the spring thereof to move the brake arm Y into contact with the surface 119 to brake clutch R.

When the spool has been properly mounted on the spindle 97, it is held rigid by means of vacuum which is applied through ports 121, Fig. 8, from a circular valve of suitable design, shown broadly at 122, Fig. 25, formed with a plurality of annularly arranged openings 123 which apply vacuum to the ports 121 between the loading station B and the discharge station H to hold the spools on the spindles for unitary movement of the rotor 99 during the passage of the spools from loading station B to the unloading station H. From station H back to station B vacuum is not applied.

Slot locating mechanism, station C, Figs. 4 and 10

After the spool has been properly positioned on the spindle 97 at the loading station B, the rotor 99 is indexed to bring the spol to the slot locating station C, Fig. 4. Here, the slot 124 in the spool hub Fig. 2A, is oriented correctly for subsequent insertion of the film leader. Following indexing of the spool to the slot-locating station C, the spindle clutch members R and S are engaged and the spindle is driven from the motor 125 through a chain 126 and sprocket 127, as shown in Fig. 9. Spindle and clutch are engaged when oil is ported to a hydraulic cylinder 128, Fig. 9, to cause clutch members R and S to engage thereby imparting rotation to the spindle 97 from the motor 125 through chain 126 and sprocket 127. When oil is ported through a convenient manifold valve (not shown) to a cylinder 129, the cylinder is energized to move a blade mechanism 130, Figs. 4 and 8, about a pivot 131 to move a blade 132 on the free end of arm 130 radially upward against the spool hub. As the spool is rotated by spindle 97, the slot 124 in the hub will eventually register with the blade 132 and the latter will move radially into the slot thereby orienting the slot. When the blade 132 drops into the slot the spool cannot rotate further and at 315° of cam rotation, a manifold valve moves to port oil away from the clutch and brake cylinder 128, Fig. 9 to declutch the spindle and apply the brake Y to the side 119 of the driven clutch member R. The spindle is held against rotation in the same manner as above described in connection with the spool loading station B. After the slot has been thus oriented, oil flow is reversed in the cylinder 129, Fig. 9, as previously described, to withdraw the blade 132 out of the hub slot 124 and to resume the position shown in Fig. 8. Thus, the spool is now oriented and the slot 124 is properly located. Upon the next indexing of the rotor the oriented and positioned spool is then moved to the winding station D or D1.

Defective slot location

Slot locating switch SW–30, Fig. 28B, is used to establish a properly located slot for the winding operation. When claw 132, Fig. 8, drops into the slot 124 of the spool, SW–30 opens to prevent solenoid coil S–1 from being energized. Conseqently, when cam timing switch CS–12 (Fig. 28C) closes at 274°–304°, the circuit through coil S–1 will not be completed.

However, when the claw fails to drop into the spool slot switch SW–30 remains closed. Thus, when cam timing switch CS–12 closes at 274°–304°, the circuit through S–1 is completed and the solenoid coil S–1 is energized. When the coil S–1 is energized, a pin on a memory unit, of well known construction, is moved into actuating position and successively switches (not shown) at either of the the winding stations D or D1, and at banding station E, are actuated to withhold winding of the film onto the spool and also prevent subsequent application of the band. Likewise, when the pin on the memory unit is actuated to position switch SW–6 at the station H, the memory unit is actuated to energize the coil of reject spool unloading trap door solenoid S-4, Fig. 28B. The trap door (not shown) is mechanically linked to solenoid S-4 so when the door opens the rejected spool is shunted down a chute (not shown) into the reject spool tray (also not shown).

*Winding film on spool, stations D–D1 Fig. 4*

In the present embodiment, two winding stations D and D1, Fig. 4, are provided so that when one station is being used to wind the film, the other station may be threaded up ready for operation, so that a supply of film is always available in at least one of the stations. Each station is supplied with film from a stock roll 135 mounted in the film cabinet 136, see Figs. 3 and 4. The film is passed over a series of idler rollers on looper arm 137 and bracket 137A, similar to those shown at 132, Fig. 4, of the above-mentioned Edwards et al. patent.

From the looper arm 137, the film passes over an idler roll 138 to a measuring sprocket wheel 139, through the combination chopper and perforator 140, and a follower arm 141 rides on the periphery of the film roll in the film cabinet, see Fig. 4.

When the timing switch CS-12, Fig. 28C closes at 270° of cam rotation, a circuit is established through normally closed relay contacts CR-8A, and through either previously closed normally open relay contacts CR-3A and CR-4 to energize the perforator operating solenoid valve SV-13 and the perforator return solenoid valve SV-12 at station D or, alternatively, through previously closed normally open relay contacts CR-5 to energize the perforator operating solenoid valve and the perforator return solenoid valve at station D1.

The metering wheel or roller 139, of well known construction, is connected to a metering mechanism generally indicated by the numeral 142, Figs. 9a and 12, and substantially the equivalent of that described in the above cited Wallace et al. application, and shown in Fig. 10 of that application. While the film is at rest in the chopper and perforator, certain codes are perforated on the leading edge of the film; and, simultaneously, a fish tail chop is made in the leading edge and a complementary chop is made in the trailing edge of the preceding wound portion of the film strip. As the fish tail chop on the leading edge is fed toward the spool, the apex of the fish tail is fed through a pair of solenoid-controlled hydraulically-operated threading lips 142a, see Fig. 4, to enter the slot 124 in the oriented spool.

By means of a convenient manifold valve (not shown), oil is ported to a latch release cylinder 143, see Fig. 12, which operates through a linkage 144 to withdraw a latch 145 mechanism from metering gear wheel 146. Simultaneously, when either of the stop dogs (not shown) close, either of two sets of two switches 162 (SW-8 and SW-31 or SW-9 and SW-32), Fig. 28, close to energize the corresponding winding motor. For example, closure of switches SW-8 and SW-31 permits the winding torque motor 148, Figs. 11 and 16 at station D to be energized, providing relay contact CR-4 is closed as later described. With closure of torque motor starting switch SW-8, brake release solenoid valve SV-19 is energized to port oil to either of two brake release solenoid valves SV-20 or SV-8 to direct oil to either spring return hydraulic cylinders 150, Fig. 9, to release brake Y and declutch R and S.

Simultaneously, thread lips release solenoid switching valve which SV-18 blocks oil from entering either thread lips solenoid valves SV-7 station D or D1 wherever winding occurs. Spring return hydraulic cylinder 149, Fig. 9, thereby allows the spring loaded lips 142a to open. When thread lips release solenoid switching valve SV-18 blocks oil to the thread lips, solenoid valve SV-7 at station D, for example, thread lips 142a at station D1 open by spring pressure. In the case of winding at station D1 the converse applies.

In the case of winding being done at station D, relay coil CR-4 is energized when cam timing switch CS-2, Fig. 28A, closes at 0° to energize the control relay coil CR-4 when relay coil CR-17 is energized. To permit energization of relay coil CR-4, follower arm switch SW-15, Fig. 28D, control relay coil CR-22, Fig. 28E (governed by the position of looper arm 137 or switch SW-20) and station D looper arm forward switch SW-18, Fig. 28D, must be closed. If any of the switching members drop out, relay coil CR-17 will not be energized, so control relay coil CR-4 will not be energized, and winding cannot be accomplished at station D. Conversely, winding operation at station D1 is set up when torque motor starting switch SW-9, Fig. 28C, closes and control relay contact CR-5 is likewise closed when cam timing switch CS-4, Fig. 28A, closes at 0°. At either winding station D or D1, when the winding torque motor 148, Fig. 11, is energized, spindle 97, Fig. 8, is driven through a gear train 151, as is deemed apparent from an inspection of Fig. 11. When oil is ported through a manifold valve (not shown) and clutch cylinder 117a, acting through a linkage, not designated, the spindle 97 is thus rotated by the torque motor 148 at the winding station D or D1 to wind a convenient length of film onto the spool. After the fish tail end is inserted in tht spool slot, the metering wheel 139, Fig. 4, feeds the film forward at a convenient rate. The torque motor 148, Fig. 11, associated with the spindle 97 at the winding station is energized, and, through gears 151, Fig. 11, connected to the spindle 97 and motor 148, winds up a definite portion of film until finally the torque motor reaches a speed which exerts a slight pull or tension on the film to over-run the metering device 142. The torque motor then continues to operate to wind up additional amounts of film until a switch, to be later described, deenergizes the torque motor to stop the latter and a brake Y, Fig. 11, is then applied to the clutch rear surface 119, Fig. 16, to stop the latter. A separate torque motor 148, Fig. 11, is associated with each spindle 97 and is connected thereto through the gear train 151. The torque motors are mounted within the rotor and are indexed as a unit therewith, as is deemed apparent from Fig. 11.

Each torque motor 148 is a 3-wire, 2-phase, 2-pole, 60-cycle, 115-volt motor, and is provided with three contacts 148a which are connected to the motor and move as a unit with the rotor 99, as is deemed apparent from Fig. 11. The machine frame 60, at each of the winding stations D and D', has mounted thereon three stationary flexible fingers 148b which, when the motor is moved to one of the winding stations, provides a wiping engagement with the three contacts 148a to complete the electrical circuit to the motor 148 to energize the latter, as is deemed apparent from an inspection of Figs. 15 and 16. The details of the circuits to motors 148 are not shown as they are deemed apparent to any engineer or electrician.

The perforator 140 is actuated when oil is ported through a manifold valve (not shown) and cylinder 140a to perforate a code identification on the film and to sever the latter from the web, leaving a portion of 9" remaining in the perforator. A rack and pinion arrangement (not shown, but of well-known construction) is actuated when hydraulic cylinder 117a, acting through a linkage (not shown) connects spindle 97 to the rack and pinion operated when oil is ported to hydraulic cylinder 152. This rack and pinion is actuated through the solenoid tail end wind-up valve SV-10, Fig. 28C, to wind up the 9" of film which remains in the perforator 140, Fig. 4.

Referring to Figs. 12 and 14, when the detent or latch 153 is released by actuation of the cylinder 143, fluid power is transmitted through metering valve 155 to hydraulic fluid motor 156 connected to a shaft 157 to drive the metering wheel 146 through a gear train 158. Shaft 157 is also connected to the measuring sprocket wheel 139, see Fig. 14, to drive the latter directly from motor 156. Simultaneously, with the release of detent 153, starting control switch 159, Fig. 12 (SW-8, Fig. 28C) is actuated by a convenient dog 160, see Fig. 13, to energize torque motor 148, Fig. 11, and SV-19, Fig. 28C, is energized to release the brake and engage thread lips release solenoid valve SV-18 to open the threading lips 142ª, Fig. 4. When the required amount of film has been wound on the spool, dog 160, Fig. 13, attached to cam 161, carried and rotatable with wheel 146, Fig. 12, contacts a convenient switch 162 to de-energize the torque motor 148, Fig. 11. As the metering wheel 146 is rotated dog 160 moves from switch 162 to switch 159, see Fig. 12, the torque motor is stationary and the 9″ of film remaining in the perforator are wound up by the above-mentioned rack and pinion arrangement.

*Out-of-film or failure-to-feed-film circuits*

Failure to feed film or an out-of-film condition at either winding station D or D1 is detected by detector switches 254 and 255 positioned on the support arm 256, Figs. 4 and 10, in front of the rotor, designated as detector switches SW-18, SW-19, (Fig. 28D), and by SW-20, SW-21 (Fig. 28E) located in the film supply cabinets 136 for each winding station, see Fig. 4.

Detector switches 254 and 255 (SW-15 and SW-16), Fig. 28B, are attached to support arm 256 in such a manner to permit detection of over-travel of yoke-arm rollers 176, Fig. 8, when spring loaded yoke arm 175 penetrates too far towards the hub of the spool.

Figure 28D:
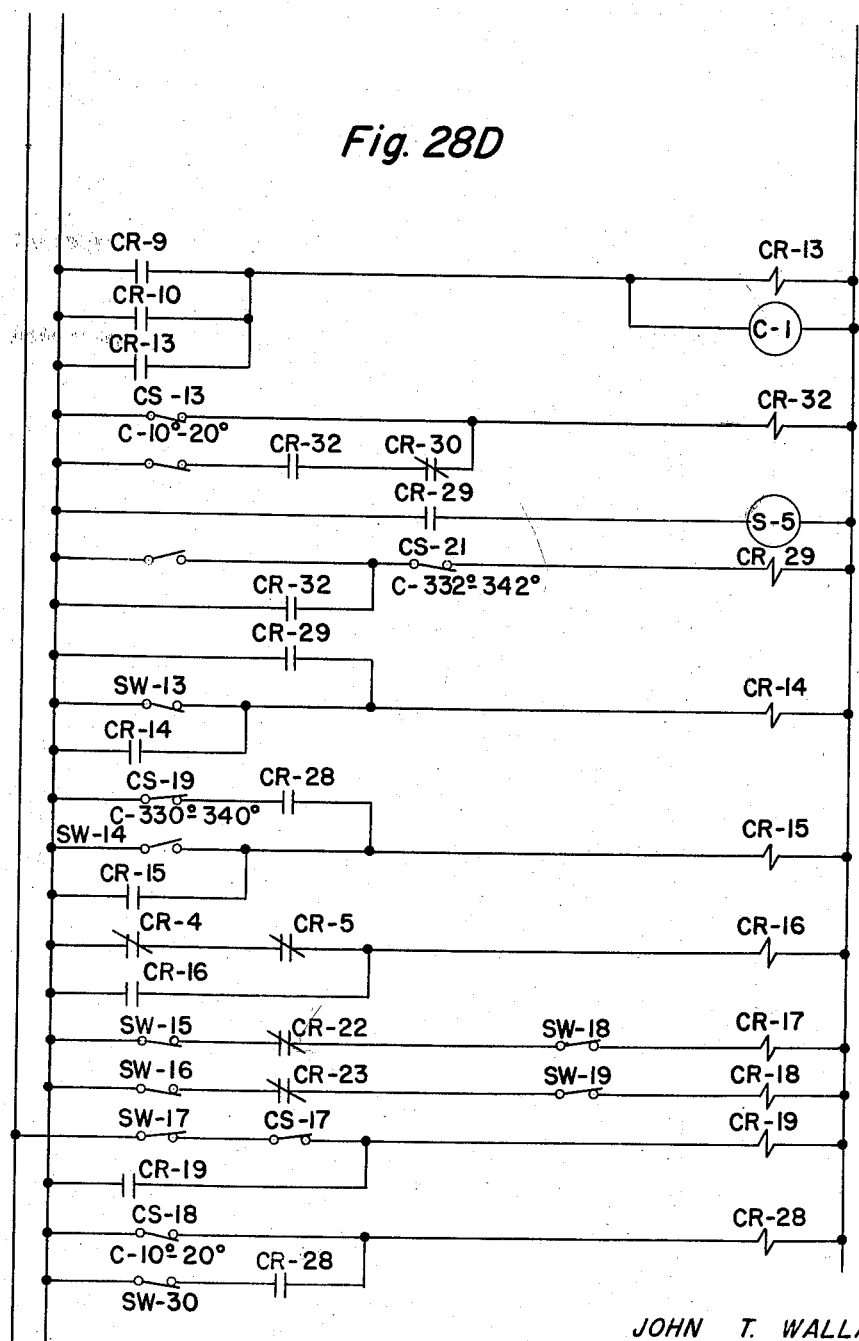

Detector switches SW-18 and SW-19, Fig. 28D, are so arranged in film cabinets 136, see Fig. 4, to permit actuation when the film follower arms 141 are in their farthest forward position closest to the film stock roll cores. Detector switches SW-20 and SW-21, Fig. 28E, are so arranged in the film cabinets to permit actuation when the film looper arms 137 are in their rear position.

De-energization of either relay CR-17 or CR-18, Fig. 28D, is accomplished when the circuits including switches SW-15 and SW-18 and relay contact CR-22 on the CR-17 relay coil, and switches SW-16 and SW-19 and relay contact CR-23 on the CR-18 relay coil are opened. When either relay coil CR-4 or CR-5 is energized, either relay contact CR-4 or CR-5 is closed and relay coils CR-9 or CR-10, Fig. 28D, can be energized when cam timed switch CS-8 closes at 290° to 355°. Energization of either relay coil CR-4 or CR-5 will determine whether "misthread" detector switches SW-4 or SW-5 are closed by reason of yoke arm rollers 176, Figs. 8 and 17, to be later described, penetrating too far towards the hub of the spool at winding station D or D1, or by reason of contacts CR-22 or CR-23 being closed when detector switches SW-20 or SW-21, Fig. 28E, are closed by action of the yoke arm rollers 176 returning to their respective rear positions under spring pressure when the opposing pressure of film web tension is removed.

When relay coils CR-9 or CR-10, Fig. 28B, are energized by reason of an "out-of-film" or "misthreaded film" condition, memory unit pins at stations D or D1 are pulled in by reason of energizing solenoid coil S-2 or S-3. With the memory unit pins pulled in at either station D or D1, memory unit switch SW-7 Fig. 28B is closed thereby de-energizing a banding feed solenoid valve SV-3, Fig. 28B, when CS-29 opens at 340° withholding the subsequent application of a band around any spool which happens to be at either station D or D1 when a "misthread" or "out-of-film" condition arises during the winding operation.

In addition, switch SW-6 in the memory unit is closed by the pulled-in-pin to energize reject spool unloading trap door solenoid S-4 and reject the unsatisfactory spool and can be described previously in the defective slot location circuit.

Three annunciator lamps on panel 300, Fig. 4, controlled by "misthread" controlled relay contacts CR-13, "out-of-film," station D controlled by relay contacts CR-17, and "out-of-film," station D1 controlled by action of relay contacts CR-18, are provided to inform whether a "misthread" or "out-of-film" condition exists. Relay coil CR-13 is energized when either relay coil CR-9 or CR-10 is energized. Relay contacts CR-17 and CR-18 close when either relay coil CR-17 or CR-18 is de-energized.

In order to maintain the film strip in its wound condition on the spool 51, means is provided for engaging the outer convolution of the wound film to retain the latter in its wound relation. To secure this result, an inverted Y-shaped spring loaded yoke, generally indicated by the numeral 175, Fig. 15, and having rollers 176, Figs. 10 and 15, is provided at the end of each leg 177, see Fig. 8, the legs being carried on the pivot 178, see Figs. 8 and 17, which is rockably connected at the lower end to the stem 179, Fig. 17, so that the legs 177 may rock relative to the stem 179 to adjust the rollers 176 on the wound film. The stem 179 slides in a housing 180, Fig. 17, in which is positioned a spring 181 which presses on the juncture point 178 of the legs 177 to press the legs 177 downward yieldably to maintain the rollers 176 in contact with the wound film, all as is deemed apparent from Fig. 17. The upper end of the yoke 175 carries a pin 183 on which are mounted a pair of roller cam followers 184 and 185. The follower 184 rides on a cam surface 186 of the shape best shown in Fig. 15 of a fixed cam 187 attached to machine frame 60, see Fig. 15. On the other hand, the follower 185 rides on the surface 189 of a movable cam 190 keyed to a shaft 191 which extends through a hollow rotor shaft 192, Fig. 17. When the spool is clutched to the spindle at station D, the cam follower 184 contacts a rise on surface 186 on cam 187 until the rotor indexes the spool to winding station D. At this point, follower 185 bearing on surface 189 of cam 190 holds yoke 175 inward to permit the maximum diameter of film to be wound on the spool at station D. When the maximum amount of film has been wound on spool 51 at winding station D, rollers 176 of yoke 175 contact the surface of the film. The film is thus restrained by the rollers 176 of yoke 175 while the film is perforated, cut and subsequently the remaining 9″ of tail is wound onto the spool. At the next subsequent indexing of the rotor 99, motion is transferred to cam follower 184 contacting cam lobe surface 186 to maintain the yoke in a fully extended position to maintain the rollers 176 in positive yieldable contact with the outer convolutions of the film on the spool under the influence of the spring 181.

Referring to Fig. 15, it is seen that if the film has been wound at station D the cam 187 is in the position shown in this figure so roller 184 drop off of lobe 192 occurs at station D. However, if the film is to be wound at station D1, the cam 190 is rotated 45° counterclockwise, as will be later described, to move the drop-off of the cam 187 to station D1 for obvious reasons. After the spool leaves station D1, the rollers 176 of yoke 175 will then hold the film in wound condition on the spool. As is apparent from Fig. 4, each perforator 140 is connected to a separate supply roll of film 135 positioned in a cabinet 136. When the lower perforator at station D is to be supplied with film from the lower stock roll 135, the cam 190 is in the position shown in Fig. 15 and the film is being supplied to station D. However, when the lower stock roll 135 becomes exhausted, film is then supplied from the upper stock roll 135 to the upper perforator 140 to wind film at station D1. In this event, it is obvious that it is necessary to rotate cam 190 45° counterclockwise to bring the drop-off point 192 to station D1. Also, when the upper supply roll is exhausted and it is necessary to transfer the lower supply roll to wind at station D, it is then necessary to rotate cam 190 clockwise 45° back to the position shown in Fig. 15. The movement of cam 190 is controlled through a suitable linkage 193, Fig. 9, connected to shaft 191 and actuated by means of a cylinder 194, see Fig. 9, which is controlled by convenient microswitches, not shown, one of which is positioned at each station D and D1. Movement of shaft 191 is limited by a mechanical latch (not shown).

The complete supply of film has now been wound onto the spool hub and the outer convolutions are held in position by the rollers 176 of one of the yokes 175. Upon the next indexing, the rotor is indexed 45° to move either from station D to station D1 or from D1 to station E at which point a wind-up band 56, see Fig. 1, is applied around the outer convolutions of the wound film on the spool 51.

*Banding station E—Figs. 4, 18, 19, 20*

After the film has been wound onto the spool at either station D or D1, the spool is declutched from its driving mechanism when either SW-8 or SW-9 is opened by latch 153 on the metering wheel mechanism 142, see Fig. 12. The rotor then indexes 45° counterclockwise from station D to D1 or from D1 to station E. Prior to the movement of the spool to station E, through a manifold valve, oil is ported to cylinder 202 which through a linkage 203, Fig. 19, rocks a guide finger 200, Fig. 18 about its pivot 201 in a counterclockwise direction to move the finger out of the path of the spool being moved from the winding station. After the spool has been moved into position at station E, the cylinder 202 is actuated in the opposite direction to return the finger 200 to the position shown in Fig. 18. The finger 200 has associated therewith a roller 204 which cooperates with the rollers 176 on the yoke 175 to provide a 3-point suspension for the film spool. In addition, a roller 205 is spring loaded and associated with a guide 206 to provide guiding means on the left side of the spool, as is apparent from Fig. 18. The parts are thus in the position shown in Fig. 18, with the finger 200 on the right side of the spool, the roller 205 and guide 206 on the left side of the spool, and the yoke 175 with its rollers 176 on the bottom of the spool. This arrangement provides a guide path substantially around the spool as is deemed apparent from Fig. 18.

A banding tape 207 is fed from a supply spool 208, Fig. 4, over an idler 209 to a metering wheel 210 which is provided with a pair of diametrically spaced driving pins 211 which engage in apertures, not shown, spaced a definite distance along the band 207 to move the band at a definite lineal displacement so as to feed out a definite length of band at each actuation of the metering wheel 210, as is deemed apparent from Fig. 18. Rotation of the supply spool 208 is stopped by application of a looper brake mechanism substantially of the type shown at 135, Fig. 4, of the Edwards et al. patent previously cited herein. During the clockwise rotation of the metering wheel 210, the band 207 is held against the wheel by a fixed guide 212. As the band leaves the wheel 210, it is passed between a pair of stationary guides 213 which direct the band down to the wound spool to enable the rollers 204, 205 and 176 to guide the band around the wound spool as indicated in Fig. 18. The leading end 215 of the band is then directed to the position shown in Fig. 18 to overlie the main portion of the band.

The spool of film at station E is rotated by means of a motor 237, chain 238 and sprocket 239, Fig. 9, when clutch cylinder 215 is energized in a manner previously described at 65° of cam shaft rotation through a convenient linkage 216 to release brake on spindle disc and bring a driving spindle into contact with serrated clutch disc R of the type shown in Figs. 11 and 16, thereby releasing the wound spool of film for free rotation while the band is being fed downward from the metering wheel 210, as shown in Fig. 18. The spool is rotated clockwise, Fig. 18, while the band is being fed downwardly by the metering wheel 210. The spool rotates sufficiently to insure that the band is wrapped around the wound film and the leading end 215 is brought into overlying relation with the main portion of the band 207 above the film spool, as shown in Fig. 18. In order to provide the desired length of band so the latter will be positioned as indicated in Fig. 18, the metering wheel 210 is moved a definite amount. To secure this result, a spindle 217, the lower end of which is loosely connected to ratchet arm 218 of the shape best shown in Fig. 19, is connected by a linkage 219 to a cylinder 220, Figs. 19 and 20. The free end of the arm 218 carries a pawl 221 which is held by a spring 222 in contact with a ratchet 223 which is formed with six peripheral notches 224. The result is that upon each actuation of the cylinder 220, the pawl 221 engages in one of the notches 224 to move the ratchet 223 a distance of 60°. The shaft 217 has mounted thereon an arm and a sleeve 226 to which is secured, in any suitable manner, the ratchet 223 and a gear 227. The latter, in turn, is meshed with a gear 228 mounted on shaft 229 of the metering wheel 210. The result is that when the cylinder 220 is actuated through a manifold at 80° of cam rotation to impart a clockwise movement to the arm 218, as seen in Fig. 19, the pawl 221 engages any one of the notches 224 of the ratchet 223 to impart a 60° rotation to the gear 227 which through gear 228 will impart a 180° rotation to shaft 229 to rotate the metering wheel 180°. This 180° movement of the metering wheel is sufficient to feed the proper length of banding tape so the latter will be wrapped around the spool in the position shown in Fig. 18.

With the parts now in the position shown in Fig. 18, a movable heater 232 is moved through a linkage from the cylinder mounted endwise on plate 233, Fig. 19, to the right, as viewed in Fig. 18, to cooperate with a spring loaded striking pad 234 to apply heat to the polyethylene-coated band 207 to heat the latter to cause the leading end 215 of the band to adhere to the adjacent portion thereof, as is readily apparent from an inspection of Fig. 18. While the parts 232 and 234 thus are held in position against the band 207, a cylinder mounted endwise on plate 235, Fig. 19, is energized to move the knife 236 to the left as viewed in Fig. 18, to sever the band just above the leading end 215. After the band has been thus severed, the heater 232 is again moved to the left when the cylinder mounted on plate 233 is de-energized. During the heat sealing and severing operation, oil is ported through cylinder 215, Fig. 19, in the opposite direction to declutch the spool so the latter remains stationary during the sealing and severing operation for obvious reasons. After the web has been severed and the heater 232 moved to the left, oil is again ported through cylinder 215 which, through linkage 216, again clutches the spool to the driving mechanism, as above described, to impart a clockwise revolution to the spool. This clockwise revolution serves to move the adhered tail portion 57 against the spool to position the tail down against the main portion of the band on the spool as shown in Fig. 1.

After the band has been applied to the spool, adhered, severed, folded down onto the wound spool, the rotor is again indexed 45° counterclockwise to move the banded spool from the banding station E to the can loading station F, see Fig. 4.

The proper amount of banding paper is insured by placing a vacuum detector switch SW-40 in series with a cam timing switch CS-21 and control relay CR-29, see Fig. 28D. When cam timing switch CS-21 closes at 321° of cam rotation, and vacuum switch SW-40 is energized, CR-29 is closed and relay contact CR-29 also closes to energize an "out of paper" relay coil CR-14. With CR-14 sealed in by holding contacts CR-14, another contact CR-14 on the same relay also opens to open the cam motor control circuit, thereby stopping the machine.

There is also another detecting switch positioned adjacent the paper supply roll to detect an "out of banding" paper condition. This detector switch SW-13 is held closed while there is sufficient paper on the supply roll. When the paper is exhausted from the supply roll SW–13 will open, thereby de-energizing "out of paper" relay CR–14. Relay contact CR–14 in the cam motor control circuit will thereby be opened to de-energize the cam motor circuit and stop the machine.

When the SW–40 detector switch is closed, a cam timing switch CS–21 closes to energize control relay coil CR–29, the relay contacts CR–29 in circuit incorporating relay coil S–5 at station E in the memory unit, of well known construction, closes to energize the solenoid coil S–5 and pull in a memory pin. With such memory pin pulled in, memory drum pick-up switch SW–6 is closed at a subsequent machine cycle to energize reject spool unloading trap door solenoid coil S–4 which acts to reject the spool and can, as previously described. The banding paper is withheld from the spool whenever a pin and the memory unit of well-known design actuated a pick-up switch SW–7 which energizes the banding feed solenoid valve SV–3 to block passage to spring return cylinder 220, see Fig. 20, and thereby withholds movement from ratchet 223 and metering wheel 210 to prevent banding paper from being fed out.

*Placing wound spool in can bottom—Figs. 21 and 22*

Following application of the band and co-incident with the following indexing motion, the inverted Y-shaped, spring-loaded yoke, generally indicated by the numeral 175, Fig. 15, is withdrawn from contact with the band 56 wrapped around the film on the spool 51. During indexing of rotor 99, motion is transferred from cam follower 184 to cam follower 185 contacting surface 189 on fixed cam 187, as force of rotation carries yoke 175 away from movable cam 190, as is deemed apparent from Fig. 17. Shape of surface 186 on fixed cam 187 causes yoke 175 to be retracted inward toward the center of rotor 99, as force of rotation during indexing causes the stem of yoke 175, Fig. 17, to slide inwardly within housing 180 and draw rollers 176, Figs. 10 and 17, attached to legs 177 away from contact with band 56.

As above described, in connection with Fig. 4, the can bottoms 58 are fed from a chute (not shown) into a can magazine 250, as shown in Fig. 21. Referring to Fig. 22, it is now seen that the can bottoms 58 are selectively brought into inclined relation with the wound film spool. The leading edge 251 of the outer flange 53 of the wound film spool contacts the inner surface 252 of the can bottom 58 and moves axially with a wiping action to force the can bottom 58 over the wound spool 51, under the pressure of spring loaded guide 253 until axial movement has forced the bottom 58 entirely over the wound film spool. This action takes place during the rotor indexing from station F to station G. At the latter station the wound film spool is completely housed within the can bottom 58.

*Can unloading station G—Figs. 4, 11, 23, 24*

At station G, an arm 260, Fig. 24, projects outward from the machine frame and has pivotally mounted at 261 at the outer end thereof, an arm 262 the upper end of which is provided with a pair of inwardly extending spring-loaded fingers 263 of the shape best shown in Fig. 24. The inner surfaces 264 of the arms 263 are provided with aligned recesses 265 which are so positioned that when oil is ported through a manifold valve to cylinder 258 a linkage 269 is moved and arm 262 is rocked clockwise, Fig. 24, about its pivot 261 and the arms 263 will slide over the side walls 266 of the can bottom 58 until they reach the position shown in Fig. 24. At this time, a shoulder 267 on each arm 263 extends over the top edge of the can bottom and overlies the inner flange 53 of the spool positioned in the can bottom, as shown in Fig. 24, to retain the spool positioned in the can. At 245° of cam rotation in the machine cycle, oil is ported through a manifold valve away from cylinder 268 and the arm 262 is rocked counterclockwise about its pivot 261 to move the can and spool to the horizontal position shown in dotted lines in Fig. 24. The clockwise movement of the arm to the full line position is controlled by a cylinder 268 which is connected by a link 269 to a crank arm 269a carried by the arm 262. This cylinder 268 is controlled in proper timed relation by means of a cam and manifold valve of the type described in the above-mentioned Edwards et al. patent.

When the can and spool have been moved to the horizontal position shown in the dotted lines, Fig. 24, an ejector arm 270, which is pivoted at 271, is rocked clockwise when oil is ported through a manifold valve to cylinder 290 which moves a linkage 291, Fig. 23, so that a pusher 272 at the free end thereof will engage the can with its spool to move the latter to the left as viewed in Fig. 23, to disengage the can and spool from fingers 263, Fig. 24, and to slide the can into ejection chute 273 which is inclined outward to the left, as shown in Fig. 4, to guide the can bottom with the spools onto a moving conveyor belt (not shown). This conveyor belt moves the can bottom with its spool into a capping mechanism (not shown) sold under the name of CAPEM and produced by the aforementioned company. As this mechanism forms no part of the present invention no details are shown or described. Suffice it to say, this device supplies a cover or closure member on top of the can and also an exposure guide.

While the above-described operations at the various stations of the turret have been described separately, it is apparent from the timing chart, Fig. 27, that these operations at the different stations are performed simultaneously and in proper timed relation, so that as the spools move from station A around to station H, the various operations are performed successively to produce a wound spool which is positioned in the can ready to be ejected to the capping or covering mechanism.

In order to retain the spool on the spindle 97, Fig. 8, it is necessary to supply vacuum to the spindle ports 121, as mentioned above. To secure this result, vacuum is supplied through a line 280, to a chamber 281 Fig. 17, and through lines 282 and 283, through a valve housing 285 having a spring-loaded valve stem 286 slidable therein and then to a housing 287 in which the spindle 97 is mounted. When the valve stem is in its inward position to press on a spring 295, vacuum is supplied to the housing 287 of spindle 97 to provide the vacuum to hold the spool on the spindle. The valve stem 286 is held at its inward position by means of a fixed cam, not shown, carried by the machine frame. When the spindle reaches station H and the spool and can are unloaded, the valve stem rides off the fixed cam and the valve stem 286 moves to the right under the action of spring 295, to the position shown in Fig. 17, to bleed vacuum from the spindle 97. The vacuum is then blocked off from station H to station B so that no vacuum will be applied to the spindles between these two stations. In other words, vacuum is applied to the spindle ports 121 while the spindle passes from station B to station H, and from station H back to station B no vacuum is supplied to the spindle.

*Spool transfer check circuits*

When the cam timing switch CS–17 closes at 120°, and spool transfer check switch SW–17 is closed, loading jam control relay coil CR–1 is energized, normally closed contacts CR–19 open, and the cam motor control circuit opens. And with normally open contacts CR–19 closed, the circuit to the loading jam signal lamp is completed. This lamp is located on the annunciator panel, schematically shown in Fig. 28E. In a similar manner, when cam timing switch CS–23 closes at 340°, a detector switch SW–11, schematically shown in Fig. 28E, is actuated and unloading jam control relay coil CR–31 is energized. This will likewise open the cam motor control circuit and also complete the circuit to the unloading jam signal lamp on the annunciator panel 296, Fig. 4, and schematically shown in Fig. 28E. Similarly, when transfer arm 262 fails to take up a position which will permit the spool and can to be properly ejected, output transfer switch SW–41, schematically shown in Fig. 28E, will be closed. Thus, when cam timing switch CS–24 closes at 10° of cam shaft rotation and output spool transfer switch SW–41 closes, control relay coil CR–36 is energized and holding contacts CR–36 close to seal in the coil and open contacts CR–36 in the cam motor control circuit to stop the machine. Likewise, CR–36 contacts in the circuit to unloading jam signal lamp on the annunciator panel close to establish the circuit and light the lamp. Cams similar to those described in the above-mentioned Edwards et al. patent are used to establish circuits at particular points in the machine cycle to test the switches positioned at strategic points to detect any defects which may be present.

The various indexing movements of the turret, as well as the various control mechanisms, are actuated by the main cam shaft and the cams are of the type shown and described in the above-mentioned Edwards et al. patent. As this structure forms no part of the present invention, details are not shown or described.

The above invention thus provides a new and improved machine for winding automatically a definite length of Cine film. As the spool is passed automatically to the various stations by means of an indexing rotor or turret, various operations are performed. These operations are performed simultaneously on different spools at the different stations. Novel means is provided to orient the spool proper as well as the spool slot, and to wind a retaining band around the wound film. The wound spool and its retaining band are then placed automatically in a can bottom, and the latter with its wound film spool is ejected from the machine. The machine is completely automatic so as to require the minimum of attention on the part of the operator.

While certain electrical components have been shown and described, others have been omitted as the latter do not form a part of and are not deemed necessary to a full and complete understanding of the present invention. However, such additional components would be suggested readily to any competent machine designer.

While certain embodiments of the invention have been disclosed, it is to be understood that the inventive idea may be carried out in a number of ways. Therefore, this application is not to be limited to the precise details described, but is intended to cover all variations and modifications thereof which fall within the scope of the appended claims.

What I claim and desire to secure by Letters Patent of the United States is:

1. A machine for automatically spooling strip film on a reel having a pair of flanges, comprising a movable turret for rotatably supporting a film reel thereon, means for orienting an empty reel to facilitate placing said empty reel on said turret with a selected reel flange facing in a predetermined direction, means for placing said empty reel so oriented on said turret, means for indexing the turret to move the reel successively to a plurality of stations, means at a first station for attaching film to the reel and rotating the reel to wind a predetermined length of film thereon, means at a second station for removing the wound reel of film from the turret, and power actuated control means connected to said turret and other recited means for operating same automatically and in timed sequence.

2. A machine for automatically spooling strip film on a reel having a pair of flanges, comprising a movable turret for rotatably supporting a film reel thereon, means for orienting an empty reel to facilitate placing said empty reel on said turret with a selected reel flange facing in a predetermined direction, means for placing said empty reel so oriented on said turret, means for indexing the turret to move the reel successively to a plurality of stations, means at a first station for attaching film to the reel and rotating the reel to wind a predetermined length of film thereon, means at a second station for placing a retaining band around the film on the reel, means at a third station for removing the banded reel of film from the turret, and power actuated control means connected to said turret and said other recited means for operating same automatically in timed sequence.

3. A machine according to claim 2, wherein said means at the second station comprises a wheel for measuring out a predetermined length of tape, means to rotate said wheel to measure out said tape, means to guide and direct said tape from said wheel to said reel and to wrap said tape around the film on said reel leaving a free end portion extending from the reel, means to seal said free end portion, means to sever said tape above said free end portion, and means to roll said free end portion down on said wound film.

4. A machine according to claim 3, wherein a pair of spaced rollers is carried by said turret for yieldably engaging the outer convolutions of the wound film to maintain the film against unwinding during movement of the reel from said first station to said second station.

5. A machine for automatically spooling strip film on a reel having a pair of flanges, comprising a movable turret for rotatably supporting a film reel thereon, means for orienting an empty reel to facilitate placing said empty reel on said turret with a selected reel flange facing in a predetermined direction, means for placing said empty reel so oriented on said turret, means for indexing the turret to move the reel successively to a plurality of stations, means at a first station for attaching film to the reel and rotating the reel to wind a predetermined length of film thereon, means at a second station for engaging the wound reel with a can bottom in the course of loading the reel into the can bottom, means at a third station for removing such loaded can bottom from the turret, and power actuated control means connected to said turret and other recited means for operating same automatically and in timed sequence.

6. A machine according to claim 5, wherein said means at the second station comprises a guideway for directing an open ended can bottom into engagement with a loaded reel in such manner that the reel enters the open end of the can bottom and moves the can bottom with the reel upon indexing movement of the turret, and means for moving said can bottom and reel together to load the reel into the can bottom in the course of such indexing movement.

7. A machine for automatically spooling strip film on a reel having a pair of flanges, comprising a movable turret for rotatably supporting a film reel thereon, means for orienting an empty reel to facilitate placing said empty reel on said turret with a selected reel flange facing in a predetermined direction, means for placing said empty reel so oriented on said turret, means for indexing the turret to move the reel successively to a plurality of stations, means at a first station for attaching film to the reel and rotating the reel to wind a predetermined length of film thereon, means at a second station for placing a retaining band around the film on the reel, means at a third station for loading the wound reel into a can bottom, means at a fourth station for removing the loaded container from the turret, and power actuated control means connected to said turret and other recited means for operating same automatically and in timed sequence.

8. A machine for automatically spooling strip film onto a reel provided with a core and opposite end flanges, at least one of said flanges having an opening of a predetermined configuration therein, comprising a movable turret for rotatably supporting a film reel thereon, means cooperating with said flange opening to orient an empty reel to facilitate placing said empty reel on said turret with a selected flange facing in a predetermined direction, means for placing said empty reel so oriented on said turret, means for indexing the turret to move the reel successively to a plurality of stations, means at a first station for attaching film to the reel and rotating the reel to wind a predetermined length of film thereon, means at a second station for removing the wound reel of film from the turret, and power actuated control means connected to said turret and other recited means for operating same automatically and in timed sequence.

9. A machine according to claim 8 wherein said film reel orienting means comprises a rotatable spider, means for delivering an empty reel to said spider, sensing means cooperating with said flange opening, and means controlled by said sensing means for reversing the orientation of the reel when said sensing means indicates that said flange is facing in the direction opposite to said predetermined direction.

10. A machine according to claim 1, and means at a station preceding said first station for orienting the empty reel carried by the turret to facilitate attaching to the reel the film to be wound thereon.

11. A film reel orienting device for use with film reels having opposite end flanges formed with differently shaped openings, comprising a reel adjusting member, means to guide a reel onto said member, and movable means cooperating with one of said openings to adjust said member to orient the reel relative to said movable means.

12. A film reel orienting device for use with film reels having opposite end flanges provided with differently shaped openings, a movable adjusting member, means to supply a reel to said member, a sensing member, means to move said sensing member axially of said reel and toward one of said flanges, a pilot tip on the end of said sensing member corresponding in shape to one of said openings and movable into the latter while the flange containing said one opening faces said member, means controlled by the movement of said tip into said one opening to move said adjusting member to position the flange with the other opening facing said tip to orient said reel, the tip failing to enter the other opening when the latter faces said member so as to render such controlled means inoperative to move said member to retain the reel in its original and oriented position.

13. A film reel orienting device for use with film reels having opposite end flanges provided with differently shaped openings, a movable adjusting member, means to supply a reel to said member, a sensing member, a pilot tip on the end of said sensing member corresponding in shape to one of said openings, means to rotate said sensing member to move said tip into registering relation with said one opening, means to move said sensing member axially to shift said tip into said one opening when the latter faces said tip, means controlled by the movement of said tip into said one opening to adjust said adjusting member to bring the flange with the other opening in facing relation with said tip to orient said reel, the tip failing to enter the other opening when the latter faces the tip so as to render the controlled means inoperative to move said member to retain the reel in its original and properly oriented relation.

References Cited in the file of this patent

UNITED STATES PATENTS

| Number | Name | Date |
| --- | --- | --- |
| 2,005,846 | Parsons | June 25, 1935 |
| 2,163,010 | Richards et al. | June 20, 1939 |
| 2,524,106 | Hanson | Oct. 3, 1950 |
| 2,751,733 | Nelson | June 26, 1956 |
| 2,776,094 | Edwards et al. | Jan. 1, 1957 |

UNITED STATES PATENT OFFICE
CERTIFICATE OF CORRECTION

Patent No. 2,924,921            February 16, 1960

John T. Wallace

It is hereby certified that error appears in the printed specification of the above numbered patent requiring correction and that the said Letters Patent should read as corrected below.

Column 4, line 14, for "hold" read -- sold --; column 5, line 47, for "sprindle" read -- spindle --; column 6, line 21, for "spol" read -- spool --; column 7, line 15, for "Figs. 3 and 4" read -- Fig. 4 --; column 8, line 24, for "tht" read -- the --; column 9, line 70, for "be" read -- as --; column 12, line 67, for "energized, CR-29 is closed" read -- closed, CR-29 is energized --.

Signed and sealed this 4th day of April 1961.

(SEAL)
Attest: ERNEST W. SWIDER
Attesting Officer

ARTHUR W. CROCKER
Acting Commissioner of Patents